(12) United States Patent
Nelson et al.

(10) Patent No.: US 8,528,250 B2
(45) Date of Patent: Sep. 10, 2013

(54) FABRIC PLANT CONTAINER

(75) Inventors: Miguel Eric Nelson, Los Angeles, CA (US); Sherry Lorraine Walsh, Los Angeles, CA (US); Rodney Lee Nelson, Phoenix, AZ (US)

(73) Assignee: Woolly Pocket Corporation, Los Angeles, CA (US)

( * ) Notice: Subject to any disclaimer, the term of this patent is extended or adjusted under 35 U.S.C. 154(b) by 0 days.

(21) Appl. No.: 13/066,948

(22) Filed: Apr. 28, 2011

(65) Prior Publication Data
US 2011/0203176 A1    Aug. 25, 2011

Related U.S. Application Data

(63) Continuation-in-part of application No. PCT/US2010/000743, filed on Mar. 10, 2010.

(60) Provisional application No. 61/209,768, filed on Mar. 10, 2009, provisional application No. 61/336,985, filed on Jan. 29, 2010.

(51) Int. Cl.
*A01G 9/02* (2006.01)

(52) U.S. Cl.
USPC .................. 47/65.8; 47/66.2; 47/66.1

(58) Field of Classification Search
USPC ............ 47/65.6, 65.8, 66.1, 66.2, 66.3, 87, 47/65.5, 65.7; 383/121
See application file for complete search history.

(56) References Cited

U.S. PATENT DOCUMENTS

| | | | |
|---|---|---|---|
| 2,621,142 A * | 12/1952 | Wetherell | 428/74 |
| 3,011,689 A * | 12/1961 | Korn et al. | 383/119 |
| 3,857,934 A | 12/1974 | Bernstein et al. | |
| 4,439,950 A | 4/1984 | Kelley | |
| 6,637,155 B1 * | 10/2003 | Butler et al. | 47/73 |
| 6,766,817 B2 | 7/2004 | da Silva | |
| 7,387,823 B2 * | 6/2008 | Waterford | 428/17 |
| 2003/0035598 A1 * | 2/2003 | Hiraiwa et al. | 383/205 |
| 2004/0074142 A1 * | 4/2004 | Busby et al. | 47/65.8 |
| 2004/0200141 A1 | 10/2004 | Whitcomb | |
| 2005/0144841 A1 * | 7/2005 | Hjorth | 47/66.3 |
| 2005/0166451 A1 | 8/2005 | Stachnik | |
| 2005/0265636 A1 * | 12/2005 | Michalsky | 383/104 |
| 2006/0059775 A1 | 3/2006 | L'Estrange | |
| 2007/0269275 A1 | 11/2007 | Kimberlin | |
| 2009/0013598 A1 * | 1/2009 | Mileto | 47/48.5 |
| 2009/0020446 A1 | 1/2009 | Frankenstein et al. | |

OTHER PUBLICATIONS

International Search Report and Written Opinion mailed on Jun. 29, 2010 by the European Patent Office, completed Jun. 17, 2010 in counterpart foreign application No. PCT/US10/00743.

* cited by examiner

*Primary Examiner* — Rob Swiatek
*Assistant Examiner* — Lisa Tsang
(74) *Attorney, Agent, or Firm* — The Noblitt Group, PLLC

(57) ABSTRACT

A plant container or planter fabricated from a breathable, flexible, geo-textile, material such as recycled polyester needle-punched felt, which is self-supporting without an internal support structure. The geo-textile material is porous to both air and water, which allows air-born nutrients to pass to the roots and inhibit the ability of mold species to grow and harm the plant. The geo-textile material is configurable to various container designs that permit the non-conventional plant placement including the mounting of the plant containers on vertical surfaces, flat surfaces, and by suspension from ceilings and walls. The inclusion of a flexible, durable, impermeable, water-retaining, recycled rubber, vinyl, or plastic bottom and/or backing liner in the construction of the plant containers/hangers allow the planters to be placed on indoor and outdoor surfaces such as wood, stucco, wallboard, carpet, and various other surfaces which might otherwise be damaged by moisture.

22 Claims, 19 Drawing Sheets

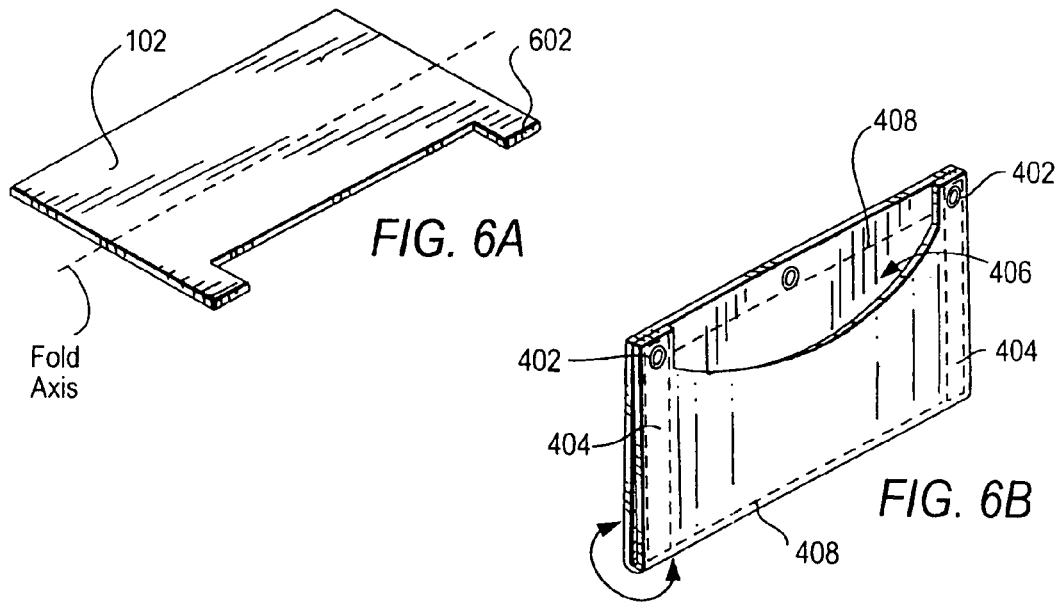
FIG. 6A
FIG. 6B
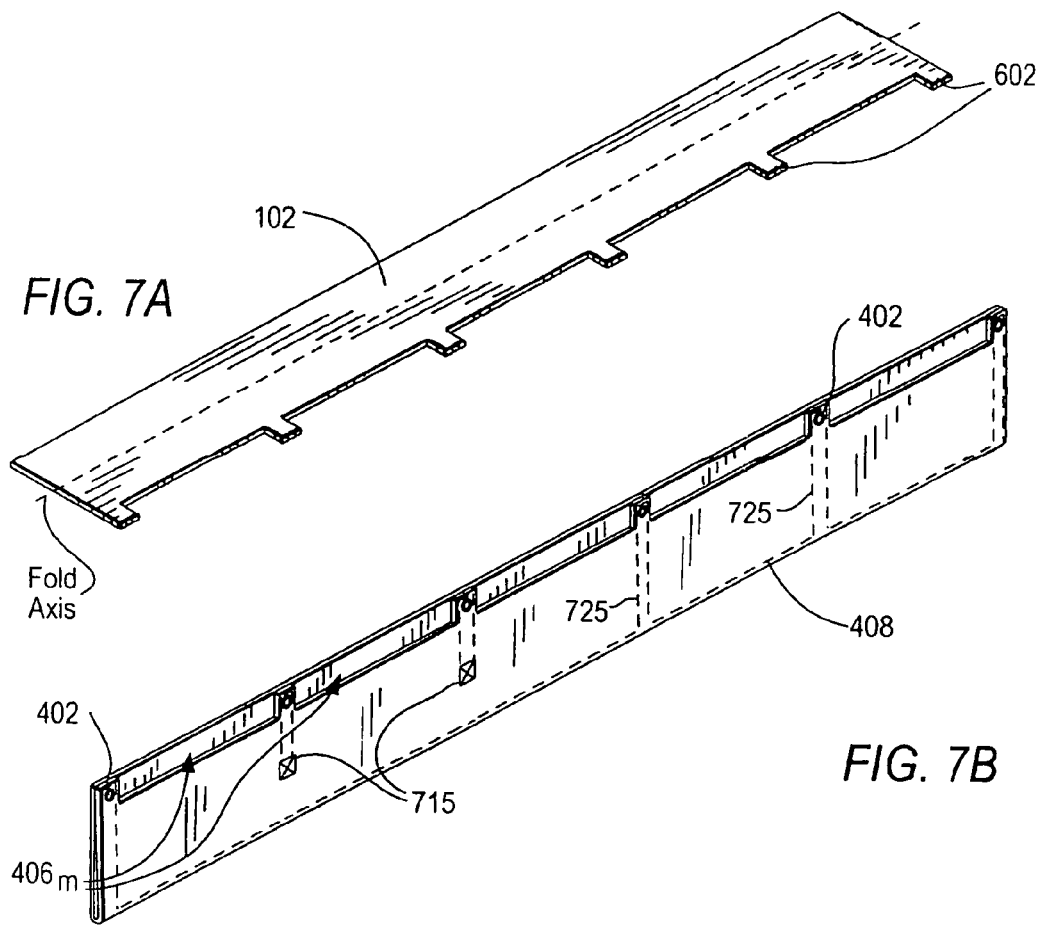
FIG. 7A
FIG. 7B

FABRIC PLANT CONTAINER

CROSS-REFERENCE TO RELATED APPLICATIONS

This patent application is a Continuation-in-Part of and claims priority to International Application No. PCT/US2010/000743, filed on Mar. 10, 2010, which claims the benefit of U.S. Provisional Application No. 61/1209,768, filed Mar. 10, 2009; and U.S. Provisional Application No. 61/336, 985, filed Jan. 29, 2010; and claims benefit of U.S. Design application No. 29/349,141, filed on Mar. 10, 2010; and is related to U.S. application Ser. No. 13/066,950, filed Apr. 28, 2011, the disclosures of which are incorporated by reference herein in their entireties.

FIELD OF THE INVENTION

The present invention relates generally to plant holders and more particularly to plant containers which can be maintained in an aerated condition that is beneficial to plant health.

BACKGROUND OF THE INVENTION

Plants are commonly grown in various types of containers including clay and plastic pots. Plant containers comprised of flexible materials that can be hung from vertical surfaces are also known. French patent application no. 2,680,626 discloses a vertical arrangement of plant containers with individual irrigation tubes wherein the containers are made of PVC sheeting. U.S. Pat. No. 4,149,339 discloses a hanging plant holder comprised of two superposed vinyl plastic sheets that are sealed together by welding along the side and lower edges to form an upper plant pocket and a lower water reservoir. United Kingdom patent application no. GB 2,070,403 discloses a hanging plant holder comprised of polyethylene sheets with plant pockets that each have an irrigation tube and a drainage hole. Unfortunately, the impermeability of plastic vinyl and polyethylene sheets to air, moisture and water make such containers damaging to long-term plant health, especially were the amount of soil held by the container is small.

Japanese Patent publication no. 2000-069854 discloses a hanging planter in the form of a bag which is comprised of a plastic sheet, a laminate or a woven or nonwoven fabric covered with a waterproofing agent, with air permeable and water retaining materials being preferred. The opposite sides of the planter bags may be sealed so as to create separate solid compartments and water channels with passages to allow water in the water channels to pass into soil in the soil compartment. Drain holes formed in the bottom of the bags permit excess water to drain from the bag.

US application publication no. 2005/0166451 to Stachnick discloses a hollow vessel having a wall comprised of a synthetic microporous sheet material selected from the group of flash-spun plexi-filamentary fabrics, spunbonded/meltdown/spunbonded ("SMS") fabrics and micro-porous film laminates, which are permeable to moisture while being substantially impermeable to water droplets. Hence, the microporous films transmit air, gas and vapor, but still act as a barrier to water.

In particular, the micro-porous material does not allow water to pass through it fast enough to drain. This means that when a plant is overwatered, the micro-porous material will retain water in, potentially overexposing the plant to moisture, which can cause rotting of the plant roots. However, over longer time periods, the lack of a water impermeable layer can eventually result in the microporous material allowing condensation to seep through the bottom and sidewalls of the container, since it is not absorbent enough to provide condensation protection. Accordingly, the microporous material is not desirable for indoor usage because water seepage on the bottom surface can damage the floors underneath.

As such, there is a need for a flexible plant container that does not leak water so that it can be used in both inside and outside spaces. There is a further need for a plant container that is made of a material that allows air and moisture to pass so that planting soil in the container can be maintained in an aerated condition that is beneficial to plant health. There is also a need for plant containers made of strong yet flexible materials that can be formed in a variety of shapes without specialized tools and the expenditure of significant energy.

The terms "plant container" and "planter," are used interchangeably. The terms "vertical plant hanger" and "vertically hanging planter" are also to be deemed equivalent in meaning as used in describing the invention.

SUMMARY OF THE INVENTION

The disadvantages heretofore associated with the prior art are overcome by the present invention of a novel and improved flexible and breathable plant container. In particular, a plant container or planter is fabricated from a breathable, flexible, geo-textile, material such as recycled polyester needle-punched felt, which is self-supporting without an internal support structure and serves as the main vessel in which the plant will live thru maturity. This type of material has been chosen for its characteristics of being porous to both air and water, which benefits all plant species allowing for air-born nutrients to easily pass to the roots and at the same time, inhibiting the ability of mold species to grow and harm the plant. The gee-textile material is adaptable to various container designs that permit the non-conventional plant placement including the mounting of the plant containers on vertical surfaces, flat surfaces, and by suspension from ceilings and walls. The lightweight, soft, shatterproof/resistant nature of the design allows for oversized planters to be easily shipped and placed by one person prior to filling with soil and planting. The inclusion of a flexible, durable, impermeable, water-retaining, recycled rubber, vinyl, or plastic bottom and/or backing liner in the construction of the plant containers/hangers allow the planters to be placed on indoor and outdoor surfaces such as wood, stucco, wallboard, carpet, and various other surfaces which might otherwise be damaged by moisture. Other advantages include, the economy of materials, their eco-friendly nature, relatively low weight for the volume contained, and the reduction in packing materials result in the most eco-sensitive manufacturing and shipping processes.

In one embodiment, the present invention is a plant container that has a flexible, durable, impermeable, water-retaining material such as a recycled rubber, vinyl, or plastic that has the ability to protect adjacent surfaces from water damage. The present invention is directed to a breathable, flexible planting container that is well aerated. The planting container is resistant to impact and breakage, and is preferably lightweight, soft, flexible in nature and of a design that permits oversized planters to be easily shipped and placed by one person prior to filling with a soil medium and plantings.

In one embodiment, the present invention includes a plant container comprising at least one sidewall formed from a first sheet fabricated from a geo-textile material constituting a polyester needle-punched felt having soft, breathable and flexible characteristics, the sidewall of the first sheet having opposing ends that are joined together; and a second sheet fabricated from a water impermeable material, the second sheet being joined to a bottom portion of the first sheet, wherein the first and second sheets form an enclosure with an open top portion.

In another embodiment, the present invention includes a vertical hanging planter comprising a front panel formed from a geo-textile material comprising a polyester needle-punched felt material that is soft, breathable and flexible, the front panel having a front bottom portion, a front top portion and opposing front end portions; a rear panel formed from the geo-textile material comprising the polyester needle-punched felt material having soft, breathable and flexible characteristics, the rear panel having a rear bottom portion, a rear top portion and opposing rear end portions, the rear panel being joined to the front panel along the front and rear bottom portions and opposing front and rear end portions to form at least one pouch therebetween, the front panel having a height less than a height of the rear panel; and at least one mounting means attached to the rear panel for receiving a fastener for securing the vertical hanging planter in a substantially vertical position with respect to a horizontal surface.

In yet another embodiment, the present invention includes a hanging planter including a front panel formed from a geo-textile material comprising a polyester needle-punched felt material having soft, breathable and flexible characteristics. The front panel has a front bottom portion, a front top portion and opposing front end portions. A rear panel is formed from a water impermeable flexible material. The rear panel has a rear bottom portion, a rear top portion and opposing rear end portions. The rear panel is joined to the front panel along the front and rear bottom portions and opposing front and rear end portions to form at least one pouch therebetween. The front panel has a height less than a height of the rear panel. At least one mounting means is attached to the rear panel for receiving a fastener for securing the vertical hanging planter in a substantially vertical position with respect to a horizontal surface.

In another embodiment, the present invention includes a self-supporting plant container comprising at least one exterior sidewall formed from a first sheet fabricated from a geo-textile material; at least one interior sidewall formed from a first sheet fabricated from a geo-textile material, the exterior sidewalls and interior sidewalls being secured adjacently to form at least one 2-ply sidewall, wherein the at least one interior sidewall faces an interior portion of the plant container and the at least one exterior sidewall forms an exterior portion of the plant container, the at least one interior and exterior sidewalls comprising a polyester needle-punched felt having soft, breathable and flexible characteristics; a first bottom sheet fabricated from a water impermeable material; a second bottom sheet fabricated from a polyester needle-punched felt, the first bottom sheet and the second bottom sheet being positioned adjacently to form at least one 2-ply bottom sheet, wherein the first bottom sheet faces the interior portion of the plant container and the second bottom sheet forms an exterior portion of the plant container; and wherein the at least one 2-ply bottom sheet is secured to a lower portion of the at least one 2-ply sidewall to form the container with a 4-ply lower sidewall portion.

In still another embodiment, the present invention includes a hanging plant container comprising a first exterior layer fabricated from a geo-textile material comprising a polyester needle-punched felt material having soft, breathable and flexible characteristics; a second interior layer fabricated from the geo-textile material, the second interior layer positioned adjacent to the first exterior layer and fastened along a periphery of the first exterior and second interior layers, the first exterior layer forming an exterior portion of the plant hanger, and the second interior layer forming an interior portion of the plant hanger; and a water impermeable flexible material inserted between the first exterior layer and the second interior layer to define a 3-ply panel, the water impermeable flexible material having a height less than the first exterior and second interior layers; the 3-ply panel being folded over itself to define a 3-ply front portion and 3-ply rear portion of the plant hanger, the rear portion and a lower section of the front portion including the water impermeable flexible material, and an upper section of the front portion being 2-plies formed by the first exterior and second interior layers, wherein opposing lateral sides of the rear panel and front panel are fastened together to form at least one pouch.

In another embodiment, the present invention includes a method of fabricating a hanging planter, comprising forming a first layer and a second layer of a geo-textile material comprising a polyester needle-punched felt material; forming a layer of a water impermeable material; overlaying the second layer over the first layer and fastening the first and second layers together about their periphery; inserting the water impermeable layer between the first and second layers to form a 3-ply panel, wherein the water impermeable layer is sized smaller than the first and second layers; folding a portion of the 3-ply panel over itself to define a rear panel and a front panel of the plant hanger; and fastening opposing sides of the rear panel and front panel together to define a pouch therebetween.

In yet another embodiment, the plant container of the present invention includes at least one sidewall formed by a first sidewall sheet fabricated from a geo-textile material comprising a polyester needle-punched felt having soft, breathable and flexible characteristics. The at least one sidewall of the first sidewall sheet has opposing ends joined together; and a first bottom sheet fabricated from a water impermeable material, where the first bottom sheet is joined to a bottom portion of the first sidewall sheet, such that the first sidewall and bottom sheets form an enclosure with an open top portion.

In one aspect, at least one exterior sidewall is formed from the first sidewall sheet fabricated from a geo-textile material and at least one interior sidewall is formed from a second sidewall sheet fabricated from the geo-textile material. The exterior sidewalls and interior sidewalls are secured adjacently to form at least one 2-ply sidewall, wherein the at least one interior sidewall faces an interior portion of the plant container and the at least one exterior sidewall faces an exterior portion of the plant container. The at least one interior and exterior sidewalls include a polyester needle-punched felt having soft, breathable and flexible characteristics. A second bottom sheet fabricated from the polyester needle-punched felt is positioned adjacently to the first bottom sheet to form a 2-ply bottom sheet, wherein the first bottom sheet faces the interior portion of the plant container and the second bottom sheet faces the exterior portion of the plant container. The 2-ply bottom sheet is secured to a lower portion of the at least one 2-ply sidewall to form a 4-ply lower portion of the container.

In still another embodiment, a vertical hanging planter includes a first front panel having a front bottom portion, a front top portion and opposing front end portions. A first rear panel has a rear bottom portion, a rear top portion and opposing rear end portions. The first rear panel is joined to the first front panel along the front and rear bottom portions and opposing front and rear end portions to form at least one pouch therebetween. The first front panel has a height less than a height of the first rear panel, wherein at least a portion of at least one of the first front and rear panels is formed from a geo-textile material comprising a polyester needle-punched felt material having soft, breathable and flexible characteristics, and at least one mounting means attached to the rear panel for receiving a fastener for securing the vertical hanging planter in a substantially vertical position with respect to a horizontal surface.

In one aspect, a second front panel is positioned adjacent to the first front panel and fastened along a periphery of the first and second front panels. The first front panel forms an exterior layer of the plant hanger, and the second front panel forms an interior layer of the plant hanger. A second rear panel is positioned adjacent to the first rear panel and fastened along a periphery of the first and second rear panels. The first rear panel forms an exterior layer of the plant hanger, and the second rear panel forms an interior layer of the plant hanger, wherein at least a portion of at least one of the second front and rear panels is fabricated from the geo-textile material. A water impermeable flexible material is inserted between at least a portion of the exterior layer and the interior layer to define a 3-ply panel, where the water impermeable flexible material has a height less than the exterior and interior layers.

In still another embodiment, a vertically hanging planter comprises a front panel having a front bottom portion, a front top portion and opposing front end portions; an external rear panel having a rear bottom portion, a rear top portion and opposing rear end portions, the external rear panel being joined to the front panel along the front and rear bottom portions and opposing front and rear end portions to form at least one pouch therebetween, the front panel having a height less than a height of the external rear panel, and wherein at least a portion of at least one of said front and external rear panels is formed from a geo-textile material that is air and moisture permeable; a liner fabricated from a water-impermeable material and positioned within and defining a first interior surface of the at least one pouch; and an interior rear panel having a bottom portion, top portion and opposing end portions and being fabricated from the geo-textile material, the interior rear panel being positioned over the at least a portion of the water-impermeable liner and defining a second interior surface of the at least one pouch.

In one aspect, the front panel, the rear panel and the interior rear panel are fabricated from a single sheet of the geo-textile material. In another aspect, the opposing front and rear ends of the front and rear panels are joined together by adhesive bonding and/or stitching. In one embodiment, the front and rear panels are joined together at one or more intermediately spaced locations between the opposing ends of the planter to form a plurality of pouches.

In another embodiment, the water-impermeable liner covers at least a portion of the rear panel proximate the bottom of the at least one pouch. Alternatively, the water-impermeable liner covers at least a portion of the front panel proximate the bottom of the at least one pouch. In one aspect, the water-impermeable liner extends downward from the top portion of the rear panel to at least the bottom portion of the rear panel proximate the bottom of the at least one pouch.

In yet another aspect, the water-impermeable liner can have a width extending to the opposing ends of the front and exterior rear panels. Alternatively, the water-impermeable liner has a width extending between the opposing ends of the front and exterior rear panels.

In one aspect, the interior rear panel has a width extending to the opposing ends of the front and exterior rear panels. Alternatively, the interior rear panel has a width extending between the opposing ends of the front and exterior rear panels.

BRIEF DESCRIPTION OF THE DRAWINGS

Further advantages and features of the present invention will become apparent from the detailed description of a preferred embodiment of the invention with reference to the accompanying drawings, in which:

FIG. 4A is a single plant hanger, FIG. 4B is a triple plant hanger, and FIG. 4C is a quintuple plant hanger;

FIG. 5A is a single plant hanger, FIG. 5B is a triple plant hanger, and FIG. 5C is a quintuple plant hanger;

FIG. 6 is a flow diagram of a method for fabricating a vertically mountable single-ply hanging planter having a single pouch;

FIG. 7 is a flow diagram of a method for fabricating a vertically mountable single-ply hanging planter having multiple pouches;

Figure 1:
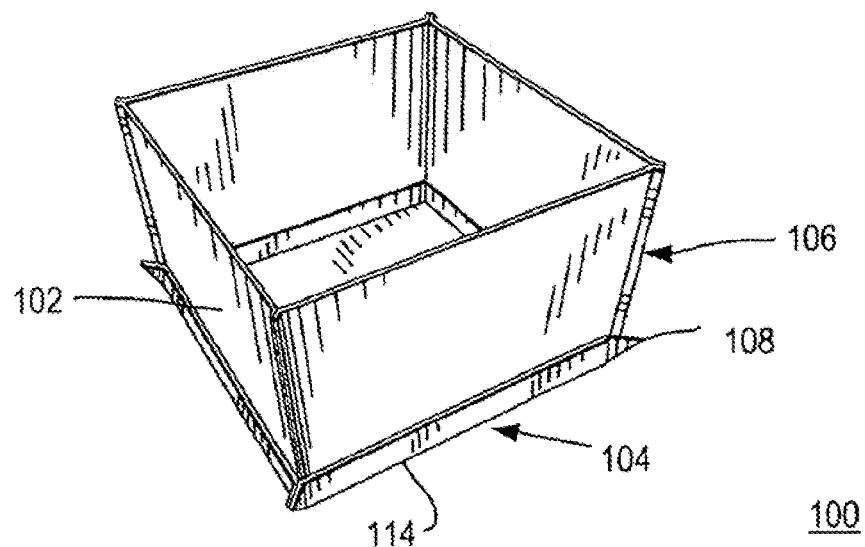
FIG. 1 is a top perspective view of a first embodiment of a 2-ply flexible plant container having external visible seams and suitable for placement on a flooring surface or ground.

To facilitate understanding of the invention, identical reference numerals have been used, when appropriate, to designate the same or similar elements that are common to the figures. Further, unless stated otherwise, the drawings shown and discussed in the figures are not drawn to scale, but are shown for illustrative purposes only.

DESCRIPTION OF THE PREFERRED EMBODIMENTS

The present invention relates to a plant container and hanging planter comprising a breathable, flexible geo-textile, such as a recycled polyester needle-punched felt and a flexible, durable, impermeable, water retaining material, such as a recycled rubber, vinyl, plastic or other flexible, liquid impermeable material that can be joined together by stitching, fasteners and/or adhesives. More specifically the present invention relates to a novel planting container and hanging planter that can be formed as a vessel for retaining plants on a horizontal surface, such as a floor, ground or table surface, or can be formed as a vessel for retaining plants in a vertical position, such as being mounted or hung from a wall surface or ceiling. The various embodiments are depicted below with respect to FIGS. 1 thru 19B.

Figure 2:
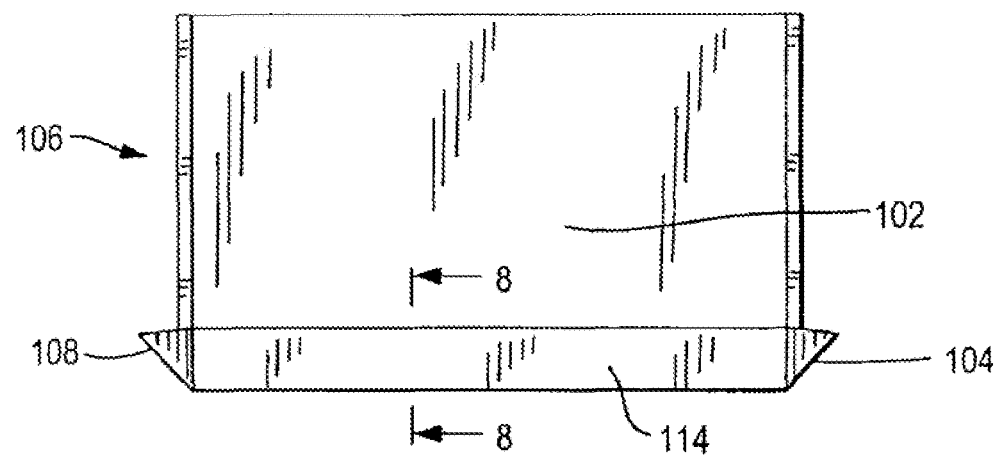
FIG. 2 is a side view of the 2-ply flexible plant container of FIG. 1.
Figure 3:
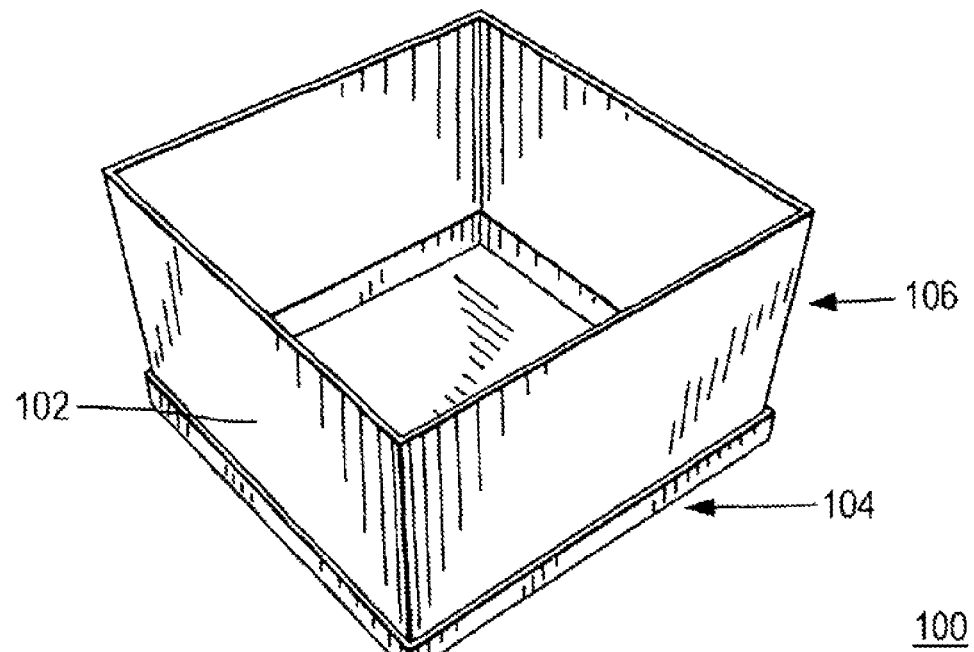
FIG. 3 is a top perspective view of a second embodiment of the 2-ply flexible plant container of FIG. 1 without external visible seams.

FIGS. 1, 2 and 3 illustrate two embodiments of a 2-ply flexible plant container. Referring to FIG. 1, a top perspective view of a first embodiment of a flexible plant container 100 suitable for placement on a floor surface or ground is shown. FIG. 2 is a side view of the flexible plant container 100 of FIG. 1. Referring to FIG. 3, a top perspective view of a second embodiment of the flexible plant container 100 of FIG. 1 is illustratively shown.

Two illustrative embodiments depicted in FIG. 1-3 include two main structural components. The first component forms the side walls of the container 100 and is made of a breathable flexible geo-textile, such as recycled polyester needle-punched felt material as shown by reference 102 in FIGS. 1-3. Geo-textiles are permeable fabrics which, when used in association with soil, have the ability to reinforce, protect, or drain.

In one embodiment, the breathable material 102 is a synthetic polymer, such as polypropylene, polyester, polyethylene and polyamides. Preferably, the breathable material 102 is 100% polyester fabricated by Superior Felt & Filtration, LLC, located in Ingleside, Ill. The breathable material 102 can also be fabricated from other geo-textile materials, such as a blend of 45% recycled natural wool felt and 55% synthetic felt also fabricated by Superior Felt & Filtration, LLC, among other woven and non-woven felt materials that are air and moisture permeable. Alternatively, the breathable material 102 can be a needle-punched felt material fabricated from the manufacturer the Kunin Group, located in Hampton, N.H. The density of the breathable geo-textile is in a range of 6.3 and 7.7 ounces/square yard (oz/yd$^2$), and preferably approximately 7 oz/yd$^2$, although such densities are not considered limiting.

One advantage of using the polyester needle-punched felt material as a structural wall to retain the soil and plants, as opposed to the microporous materials described in the prior art is in the event of overwatering, the felt material allows all excess water to drain away from soil rapidly, and thus helping to prevent root rot. Other advantages include greater strength and durability, economic/environmental advantages, such as the use of recycled materials, improved texture, such as garment-like quality, and flexibility to fabricate various shapes, including customized shapes. The breathable material 102 can also be fabricated in an assortment of colors.

The breathable material 102 is first cut into a predetermined sized and shaped pattern to form at least a portion of the sidewall of the container 100. The embodiments of FIGS. 1-3 are illustratively shown as being rectangular or square. In one embodiment, the breathable material 102 has a thickness of 1/32" to 1/4" inches, and preferably has a thickness of 1/8" inches. A person of ordinary skill in the art for which the invention pertains will appreciate that other shapes and/or thicknesses can be provided (e.g., triangular, oval, cylindrical, etc.) and the illustrated shape shown in FIGS. 1-3 is not considered limiting. For example, polygonal shaped patterns can be utilized as shown and described below with respect to FIGS. 9-13.

The sidewalls 102 of the breathable geo-textile material are stitched and/or bonded at adjacent ends to form seams 106 therebetween. In the embodiment illustrated in FIGS. 1 and 2, the seams are formed externally and are visible to an onlooker. Alternatively, as shown in FIG. 3 the seams 106 are formed internally and remain substantially or completely hidden from a lateral view point.

The second structural component 104 is fabricated from a flexible, durable, water impermeable material, such as a recycled rubber, vinyl, plastic, or similar liquid impermeable materials that are flexible and can be readily sewn and/or bonded with an adhesive. In one embodiment, the impermeable material 104 is model no. HERCULITE-20, a medium duty vinyl laminated water impermeable material, which is fabricated by HERCULITE, Inc. located in Emigsville, Pa. Alternatively, the impermeable material 104 can be fabricated from other vinyl laminated materials including recycled materials. A person of ordinary skill in the art will appreciate that other grades of the water impermeable material 104 can also be utilized.

The edges of the water impermeable material 104 are stitched and/or bonded together horizontally to the bottom of all four sides of the breathable material as shown in FIGS. 1-3. The impermeable material 104 is advantageously provided so that the planter container 100 can be placed on or near indoor and outdoor surfaces, such as wood, stucco, wallboard, carpet, ceramic and various other surfaces which might otherwise be damaged or stained by moisture permeating through the breathable material 102.

Figure 8:
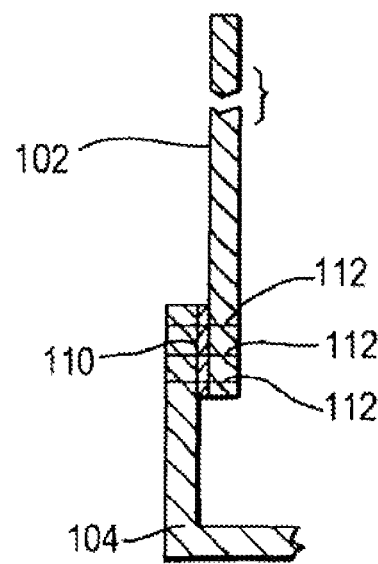
FIG. 8 is an enlarged cross-sectional view of the 2-ply flexible plant container taken along line 8-8 of FIG. 2 and illustrating an overlap junction arrangement between the breathable material main body (102) and the impermeable base material (104)

Referring to FIG. 8, preferably, the second structural component 104 (e.g., rubber, plastic or vinyl water impermeable material) overlaps the felt material 102 on the exterior of the felt, thereby forming a 2-ply portion of the plant container. The impermeable material 104 is provided so that moisture that seeps downwards through the felt via gravity will be confined within the protected bounds of the rubber material 104 and within to the container 100. The rubber-like material 104 can be formed from a single sheet or several sheets bonded together in a waterproof fashion (heat and rubber bonding flexible glue). Although the rubber-like material 104 preferably overlaps the felt material 102 on the exterior, such arrangement is not considered limiting.

The adhesive 110 and/or thread 112 that is preferably used for joining the edges of the materials is a durable, industrial synthetic thread which is preferably UV resistant and most unlikely to break or deteriorate over time with the stress of a full load including soil, the plants and water. The two sheet materials are preferably joined by stitching them together using a thread-like material that is resistant to ultra violet exposure, is water impermeable, and durable. For example, a synthetic thread 112 such as polyester having a size/weight of Tex 30 to Tex 50 (medium weight to light heavy-weight threads) can be used. For a thread having a size/weight of Tex 30, preferably, the stitch count can be in a range of 5 to 15 stitches per inch, depending on the thread weight. In one embodiment, the plies are double stitched together with 10 stitches per inch. A person of ordinary skill in the art will appreciate that other types of thread and variations of stitching patterns can be provided as well, depending on the size/weight of the thread 112.

Alternatively, the two sheet materials can be joined with an industrial-strength perma-bonding glue, sealant, tape or other adhesive 110. The rubber and felt are stitched and/or bonded together to ensure that the container is strong enough to be moved and lifted when filled with the soil, plant and water. For example, a rectangular shaped container as illustratively shown in FIGS. 10 and 11 having a sidewall width of 12 inches, a length of 12 inches and a height of 9 inches can hold a volume of approximately 1,296 cubic inches or approximately 30 lbs of soil. The bonding adhesive 110 and/or stitching 112 is strong enough to hold the panels 102 and 104 together upon lifting the plant container of the present invention with the soil and plants placed therein.

Referring to the illustrative square shaped plant containers 100 shown in FIGS. 1-3, for a square plant container with each sidewall 102 illustratively having a length of approximately 48 inches and a height of 12 inches, the impermeable material 104 extends approximately a range of 2 inches to 6 inches from the bottom surface, and preferably approximately 2 inches high from the bottom of the container 100. The overlap (e.g., interior overlap) between the sheet of breathable material 102 with the sheet of impermeable material 104 (i.e., 2-plies) is in a range of 2 inches to 6 inches, although such overlap amount is not considered limiting. Rather, persons of ordinary skill in the art will appreciate that the heights of the impermeable material 104 as measured from the bottom of the container 100 and the amount of overlap between the breathable material 102 and impermeable material 104 can vary depending on other factors such as varying dimensions of the sidewalls, for example, 36", 24", and 12" sidewalls to illustratively form square or rectangular shaped containers, the surface upon which the planter is to be placed, and the thickness of the breathable material 102.

Referring to FIGS. 1 and 2, in one embodiment, a tab 108 is formed on the impermeable material 104 when the lower sidewall portion is folded upward. In one embodiment, the size of the sheet of impermeable material 104 has a circumference that is larger than the circumference of the sheet of breathable material 102. The excess is used to form the lower sidewall portion 114 and overlap the breathable sidewall material 102. At the corners of the sheet 104, when the lower edge portions 114 are folded upwards to form the lower impermeable sidewall portion of the container 100, a triangular tab 108 is formed by the excess material. In one embodiment, opposing surfaces of the triangular tab 108 are bonded and/or stitched together so as to remain extending outwards, as shown in FIGS. 1 and 2. Alternatively, and preferably, the triangular tab portion 108 is first bonded and/or stitched together and then folded over and again bonded/stitched to the sidewall portion 114, as illustratively shown in FIGS. 9 and 10. Alternatively, the tab 108 is folded over to the sidewall portion 114 and then simply bonded/stitched thereto.

Although the present embodiment of FIGS. 1-3 is shown with four separate sidewalls, such quantity is not limiting. Rather, a person of ordinary skill in the art will appreciate that a lesser number (e.g., a single or pair of sidewalls) or greater number of sidewalls can be utilized to form the plant container.

FIGS. 9-13C depict yet another embodiment of the present invention. These embodiments are polygonal shaped container having at least five sidewalls and can be used as free standing garden planters. The containers or hereinafter "planters" are fabricated from a breathable flexible geo-textile 102, such as recycled polyester needle-punched felt material as described above with respect to FIGS. 1-8.

In an embodiment, the density of the breathable geo-textile 102 can be greater than the embodiments of FIGS. 1-8, for example, in a range of 13.0 and 17.5 ounces/square yard ($oz/yd^2$), and preferably approximately 15 $oz/yd^2$, although such densities are not considered limiting. Further, the breathable material 102 has a thickness of approximately ¼" to ¾" inches, and preferably has a thickness of approximately ¼" inch, although such thicknesses are not considered limiting. The additional thickness and density provides increased structural support.

Referring to FIGS. 9 and 10A-10C, a five-sided plant container 900 suitable for placement on the ground, flooring and the like is illustratively shown. As illustratively shown, the plant container 900 includes a bottom portion 905 and five sidewalls $906_1$-$906_5$ extending from the bottom 905. The plant container 900 is fabricated from a single sheet of the thicker/higher density breathable material 102 described above. The plant container 900 includes a bottom portion 905 and a plurality of sidewalls $906_1$-$906_n$ extending from the bottom 905. The sidewalls (collectively "sidewalls") 906 are folded, curved or otherwise turned upward and the lateral edges 908 of adjacent sidewalls 906 are secured together by stitching 910 (e.g., thread and/or staples), as illustratively shown in FIGS. 10A-10C. Alternatively, the sidewalls 904 can be secured together by a fastener, such as a zipper or a combination of zippers and stitching. The term "fastener" can include mechanical fasteners, such as hook-and-loop fasteners, and the like, releasable fasteners such as zippers, snaps, etc., as well as adhesive bonding heat welding or ultrasonic bonding, among other types of well-known fasteners.

The second structural component of the planter is fabricated from a flexible, durable, water impermeable material 104, such as a recycled rubber, vinyl, plastic, or similar liquid impermeable materials that are flexible and can be readily sewn. In one embodiment, the impermeable material 104 is model no. HERCULITE-20, a medium duty vinyl laminated water impermeable material, which is fabricated by HERCULITE, Inc. located in Emigsville, Pa. Alternatively, the impermeable material 104 can be fabricated from other vinyl laminated materials including recycled materials.

Figure 10A:
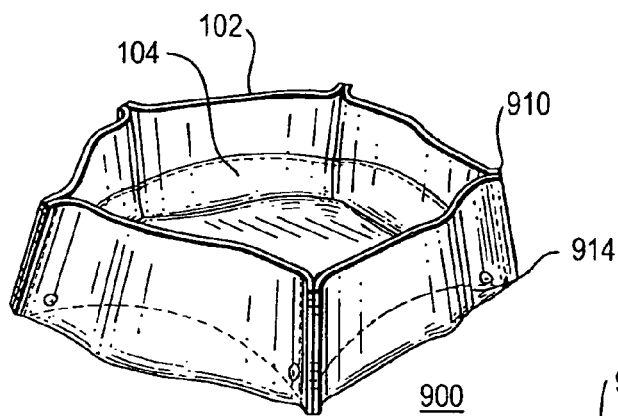
FIGS. 10A, 10B and 10C are a top perspective view, a top plan view and a side perspective view, respectively, of the flexible plant container of FIG. 9.
Figure 10B:
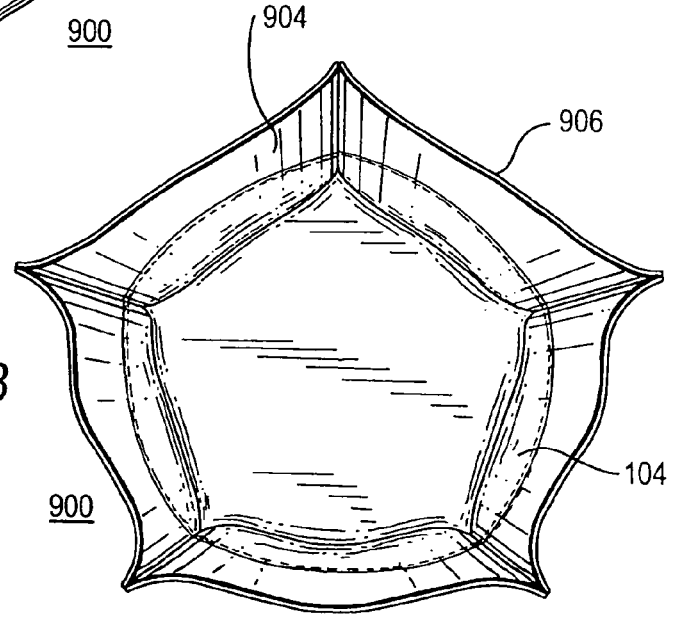
Figure 10C:
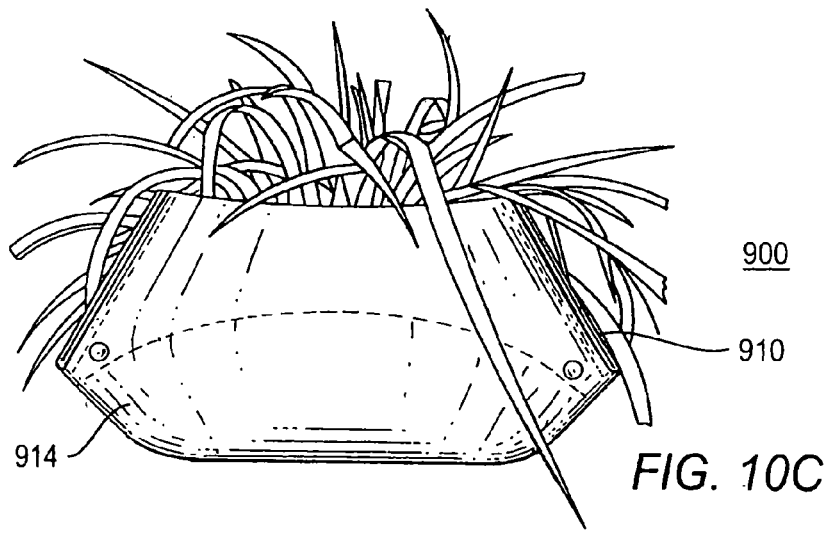

The impermeable material 104 forms a liner that is positioned along the bottom portion 905 of the breathable material 102 and preferably has a dimension that is greater than the dimensions of the bottom portion 905, such that a peripheral portion of the liner 104 extends upward when the opposing edges 908 of adjacent sidewalls 906 are joined together to form the finished container, as shown in FIGS. 10A-10C.

Preferably, the impermeable material 104 is stitched proximate its outer periphery to the interior bottom portion 905 of the breathable material 102.

The adjacent edges 908 of the sidewalls 906 can be sewn together by stitching, and are preferably sewn using a polyester thread 910 having a size/weight of Tex 30 to Tex 50, as described above with respect to the embodiments of FIGS. 1-8. Alternatively, the adjacent edges 908 are attached together with a releasable fastener, such as a zipper, hook and loop fastener, and/or other types of well-known fasteners.

One or more apertures 912 can be provided along the opposing edges 908. The apertures 912 are aligned such that a grommet, rivet, eyelet or other fastener 914 (FIGS. 10A and 10C) can be inserted and secured therethrough to provide further reinforcing of paired adjacent sidewalls 906, as shown in FIGS. 10A-10C. The grommets, rivets and other like fasteners can be fabricated from metal, ceramic, wood, plastic materials, rubber among any other durable and semi-rigid or rigid material.

Although a single grommet 914 is illustratively shown reinforcing two adjacent edges of the sidewalls together proximate the bottom portion 905, a person of ordinary skill in the art will appreciate that a plurality of grommets 914 can be provided along the length of the adjacent edges 908 for further reinforcement. The rivet or grommets 914 also are used to pinch the bottom portions of the sidewalls and effectively lift the bottom edges of the sidewalls off the flooring to help ensure that the periphery of the interior liner formed by the water impermeable material extends upwards to prevent overflow of water.

Figure 11:
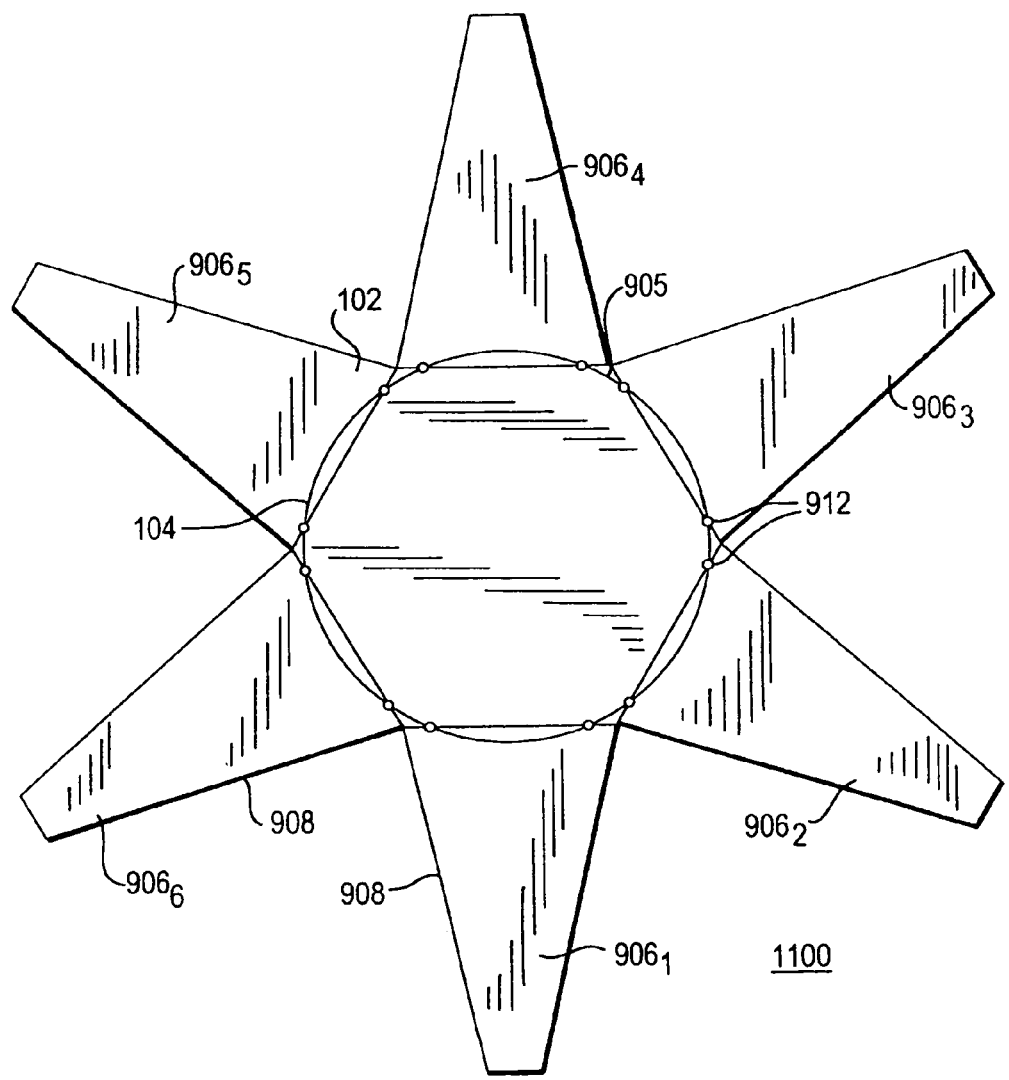
FIG. 11 is a schematic top plan view of yet another embodiment of a flexible plant container suitable for placement on a flooring surface or ground.

Referring to FIG. 11, a polygonal shaped planter 1100 having six sides is illustratively shown. The planter polygonal-sided planter 1100 is the same as the planter 900 of FIGS. 9 and 10A-10C, except one additional sidewall $906_6$ is provided. In one embodiment, the adjacent edges 908 of the sidewalls are sewn together with thread 910 as described above with respect to FIG. 9. Alternatively, one or more adjacent edges can include a zipper 916 to close the adjacent sidewalls together.

Figure 12:
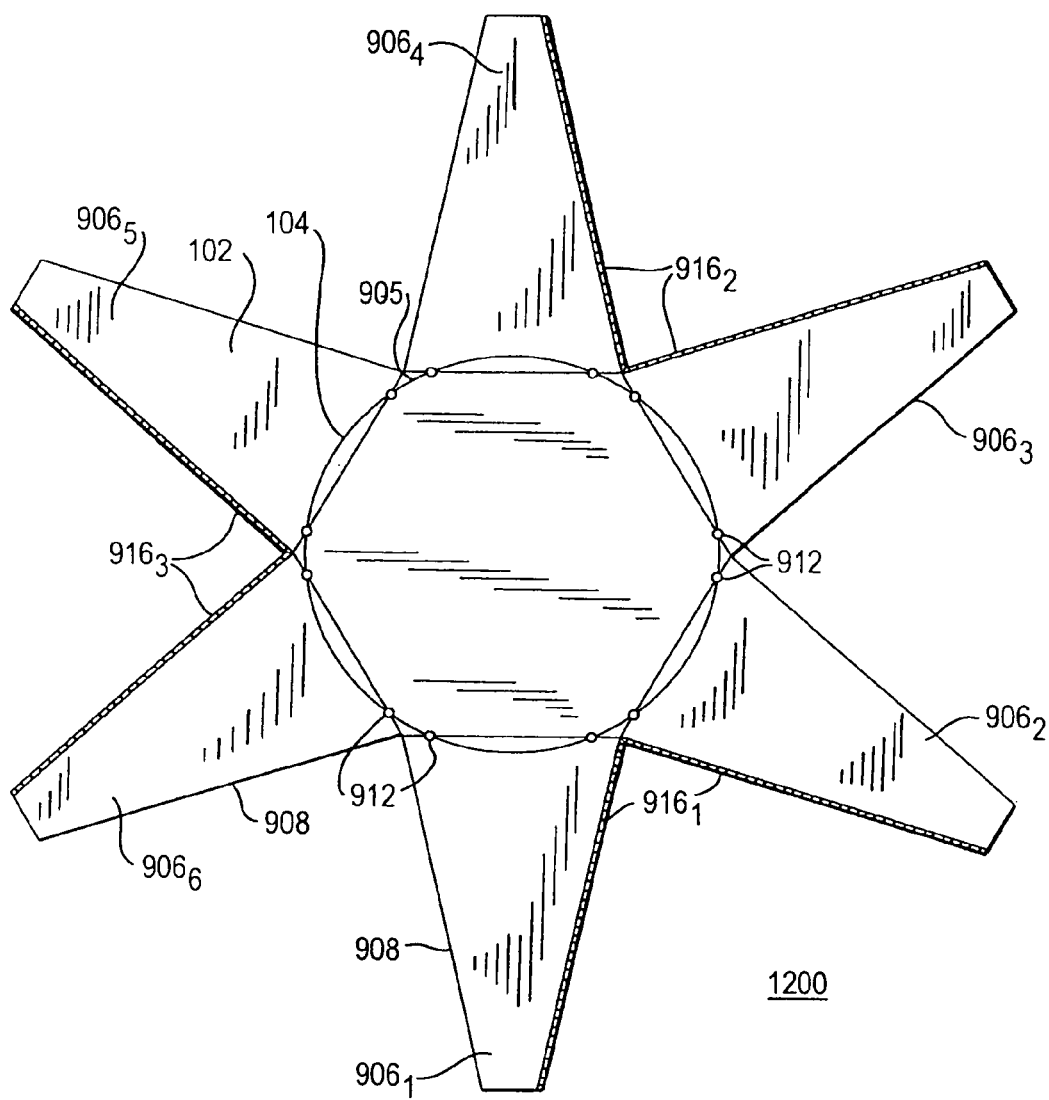
FIG. 12 is a schematic top plan view of the flexible plant container of FIG. 11 with zipper attachments.
Figure 13B:
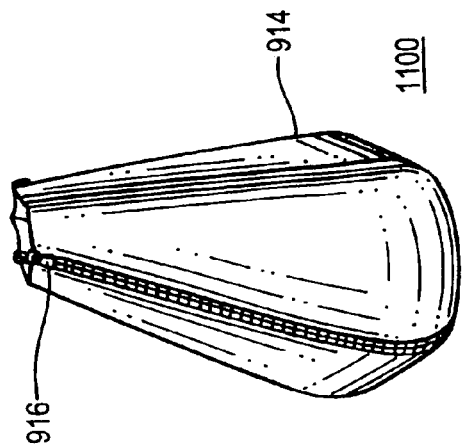
FIGS. 13A, 13B and 13C are a top perspective view in an open configuration, a side perspective view in a closed configuration, and a side perspective view in a partially closed configuration, respectively, of the flexible plant container of FIGS. 11 and 12.
Figure 13C:
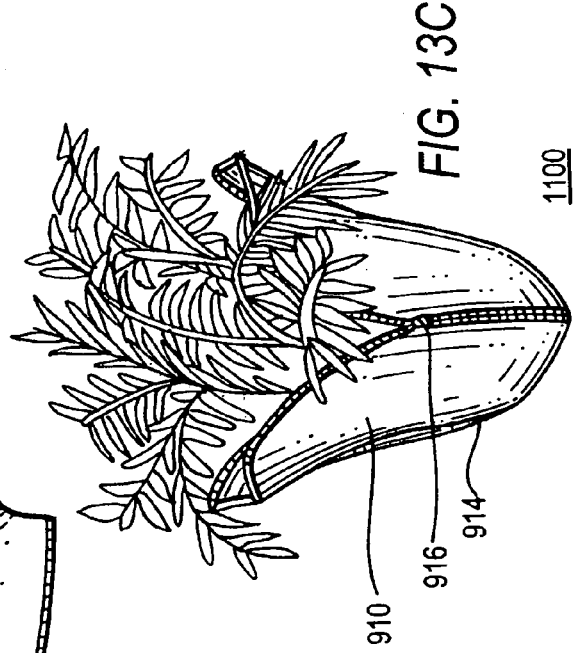
Figure 13A:
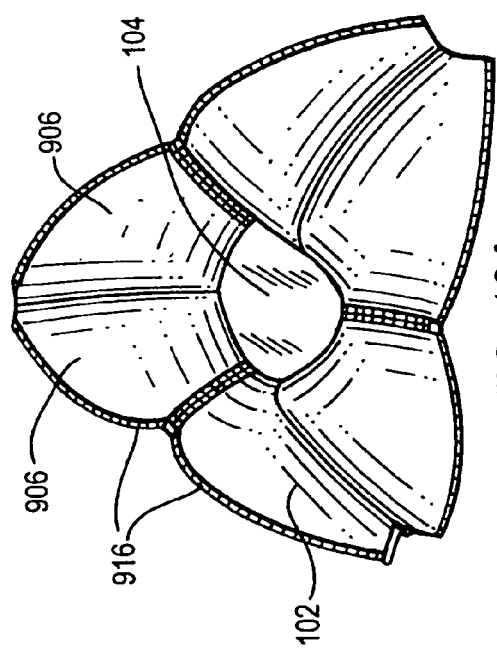

Referring to FIG. 12, three zippers $916_1$ to $916_3$ are illustratively provided along adjacent edges 908 of the sidewalls 906. The zippers 916 are interleaved between adjacent edges of the sidewalls, while the adjacent edges 908 without zippers therebetween are sewn together with thread 910, as described above with respect to FIGS. 9 and 10A-10C. The interleaved zippers 916 enable a user to open the planter to make it easier to introduce the soil and plants into the planter 1100, as illustratively shown in FIG. 13A. The zippers 916 can then be fully closed as shown in FIG. 13B, or one or more zippers 916 can be partially closed, for example, to permit low plant growth to overhang, as shown in FIG. 13C. The zippers 916 can be DA Sliders or Semi-Autolock Jean Sliders fabricated from metal, coil or VISLON®, such as those available by the YKK Corporation of Atlanta, Ga., USA, although such types of zippers are not considered limiting.

The polygon shaped planters can be constructed by cutting the breathable material 102 into a predetermined pattern, such as the substantially star-shaped patterns illustratively shown in FIGS. 9 to 13C. Optionally, apertures 912 can be formed through the breathable material 102 proximate adjacent edges 908. Adjacent apertures 912 are dimensioned and aligned to receive a rivet, grommet, or eyelet 914 to further reinforce the sidewalls 906.

A layer of the water impermeable material 104 is cut into a circular shape, preferably with a diameter greater than the diameter of a bottom interior portion 905 of the breathable material 102. The water impermeable material 104 positioned over the breathable material 102 is sewn proximately along its periphery to the bottom portion 905 of the breathable material 102, in a range of $1/16$ to $1/4$ an inch from the peripheral edge, and preferably a $1/8$ inch from the peripheral edge of the water impermeable material. Preferably the water impermeable material 104 is sewn around its entire periphery to the breathable material 102.

The adjacent edges 908 of the sidewalls 906 are then stitched together with thread 910 to form the container-like shape of the planter. In an embodiment where zippers 916 are provided, one side of the zipper track is sewn to one of the edges 908 and the other zipper track is sewn to the adjacent edge of the adjacent sidewall. In this manner, the sidewalls 906 of the planter 900 can be joined together using stitching, zippers or a combination thereof.

Once the adjacent edges 908 of the sidewalls 906 are joined (i.e., sewn or zippered) a rivet, grommet, eyelet or other like fastener 914 is inserted through each paired adjacent apertures 912. The rivet 914 is then secured, e.g., press-fitted in the aperture 912 to provide additional reinforcement to the sidewalls 906.

A person of ordinary skill in the art will appreciate that the rivets or grommets 914 can be secured in the apertures 912 prior to stitching or zippering up the adjacent sidewalls 906 together. Further, the number of sidewalls 906 shown and described herein is not limiting, as any number of sidewalls can be provided. Additionally, the dimensions of the sidewalls can vary therebetween. For example, the heights and/or widths of the some of the sidewalls can differ from other sidewalls in a planter. As well, the sidewalls can be curvilinear, as long as the adjacent edges 908 are aligned for attachment together. Moreover, a person of ordinary skill in the art will appreciate that other fasteners can be used in conjunction with or instead of the stitching or zipper fasteners for securing the adjacent edges of the sidewalls together. For example, hook and loop fasteners, snap and button fasteners, among other fasteners can be provided to secure the adjacent edges of the sidewalls together.

Referring now to FIGS. 4 and 5, vertically mountable flexible planting hangers 200 and 300, respectively, are illustratively shown. Referring to a first hanger embodiment as shown in FIG. 4, the vertical hanging planter 200 is comprised of a breathable flexible geo-textile such as recycled polyester needle-punched felt. Alternatively, in a second embodiment as shown in FIG. 5, the vertical hanging planter 200 includes both a breathable flexible geo-textile such as recycled polyester needle-punched felt and a flexible, durable, impermeable, water retaining material such as the rubber, vinyl, or plastic sheet material described above.

Figure 4A:
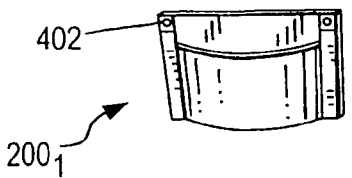
FIGS. 4A-4C depict top perspective views of vertical mounted single-ply flexible hanging planter illustratively shown in three variations, where
Figure 4B:
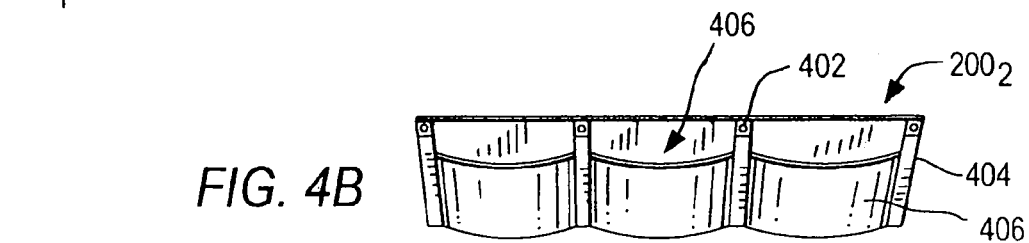
Figure 4C:
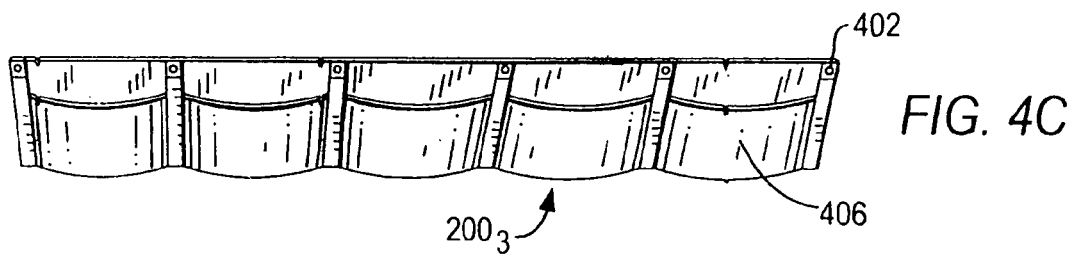
Figure 5A:
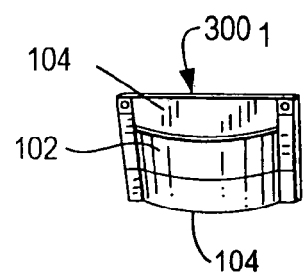
FIGS. 5A-5C depict top perspective views of three vertically mountable 2-ply flexible hanging planter embodiments, each with an impermeable material layer therein; and where
Figure 5B:
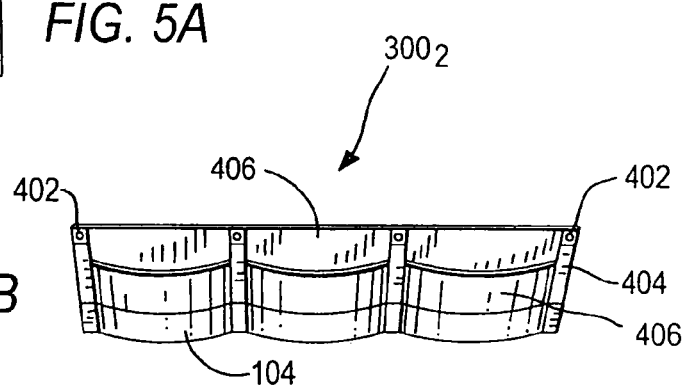
Figure 5C:
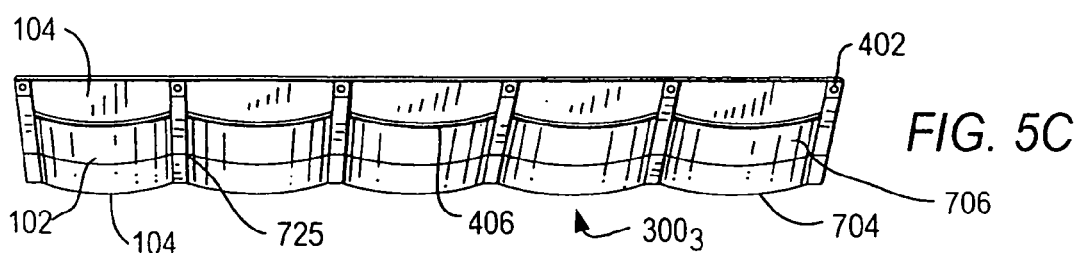
Figure 9:
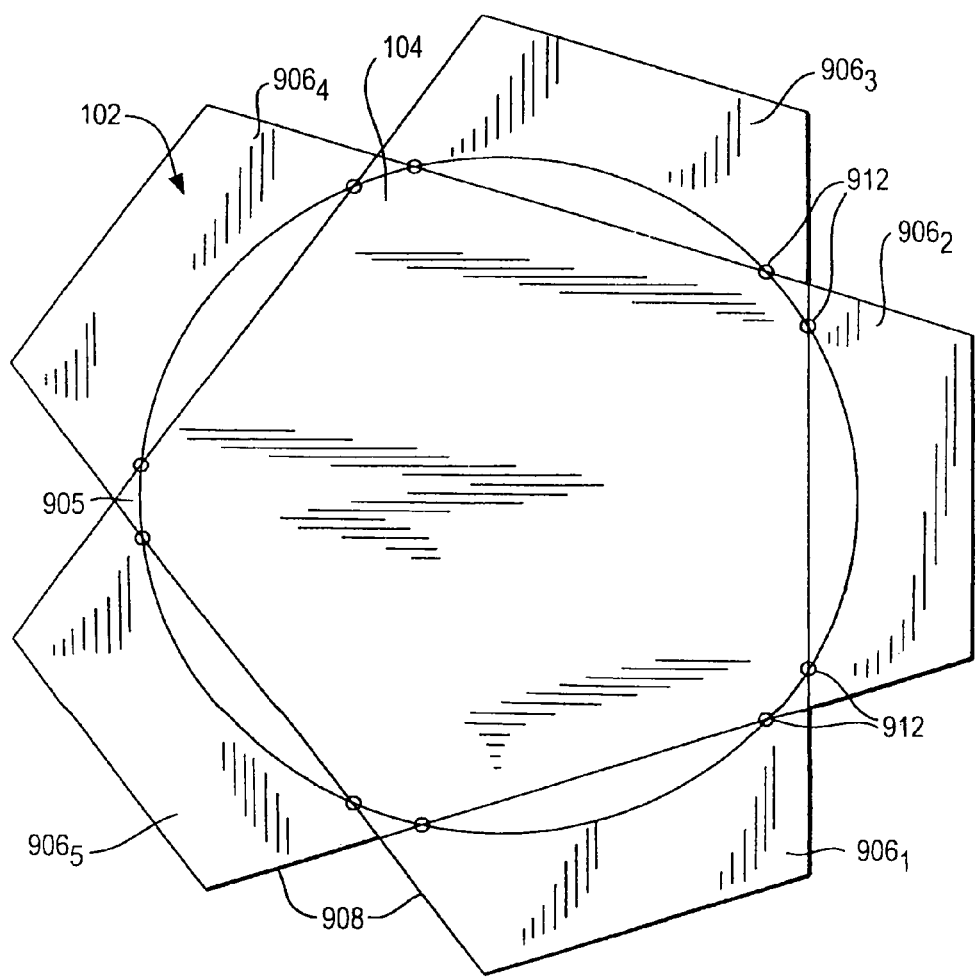
FIG. 9 is a schematic top plan view of another embodiment of a flexible plant container suitable for placement on a flooring surface or ground.

Both of these hanger embodiments (FIG. 4 & FIG. 5) can be fabricated with one or more pouches 406, such as the single hanging planter shown in FIG. 4(A) and FIG. 5(A)), triple plant hangers as shown in FIG. 4(B) and FIG. 5(B), and quintuple plant hangers as shown by FIG. 4(C) and FIG. 5(C). Each of these embodiments shown by FIGS. 4A-4C and FIGS. 5A-5C has fasteners or mounting means, which are illustratively formed by grommets 402. The grommets 402 can be fabricated from metal, ceramic or plastic, and are formed in the back portion of the hangers to permit the mounting or attachment of the vertical hangers to various vertical structures such as walls and fences. Illustratively, the single plant hanger $200_1$ has two grommets 402, the triple plant hangers $200_2$ have four grommets 402, and the quintuple plant hangers $200_3$ have six grommets 402, although such quantities are not considered limiting.

Referring to FIGS. 6A and 6B, the embodiment of the vertically mountable flexible plant hanger as illustrated in FIG. 4A includes a breathable, flexible, geo-textile material such as recycled polyester needle-punched felt material 102. This felt material 102 is first cut into the desired pattern and laid flat on a planar surface. Extended portions or strips 602 can be provided to allow access to the pouch 406.

Specifically, the plant pouches 406 are then created by folding the material 102 back onto itself along a fold axis (shown in phantom in FIG. 6A) creating a pouch that is approximately two-thirds (⅔) of the overall height of the plant hanger 200. To create the single plant hanger pouch 406 as illustratively shown in FIG. 4A, the lateral sides are stitched 404 and/or bonded vertically along the opposing side edges and the extended portions 602. The pouch 406 is formed between the opposing seams and the bottom portion of the overlapped folded material. Reinforcing stitching 408 can also be provided along the bottom and top edges of the pouch 406. Finally, a fastener, such as a grommet 402 is incorporated at the top of the seam to enable mounting or attachment to various types of vertical structures such as walls, fences and other structures.

Referring to FIGS. 7A and 7B, a flow diagram to fabricate the multi-pouch vertical plant hangers (e.g., triple and quintuple hanging planter pouches) includes a similar process cutting out the pattern, laying the pattern out flatly over a surface, folding over the front portion over the rear portion along a fold axis (shown in phantom in FIG. 7A) to form a single pouch, and then stitching and/or bonding the opposing ends from the bottom at the fold to the top of the material 102. Stitching and/or bonding 725 is also provided at intermediate areas along the material from bottom to the top of the material to illustratively form distributed (i.e., spaced) and independent plant pouches with all seams incorporating a grommet 402 at the top for mounting purposes. As illustratively shown in FIG. 7B, the pouches 406 are evenly spaced between the opposing ends, although such spacing is not limiting. Alternatively, partial intermediate stitching and/or bonding 715 (e.g., FIG. 7B) can be provided so that adjacent pouches are partially open to one another allowing the root systems between the individual plants to intermingle or they may be sewn completely top to bottom to separate the root systems from intermingling (e.g., FIG. 7B at 725). Although the pouches 406 of a multi-pouch hanger are illustratively shown as being equal in size (e.g., width), a person of ordinary skill in the art for which the present invention pertains will appreciate that the dimensions of the pouches can vary in size and shape therebetween. For example, some pouches 406 can be larger than others. Alternatively, the seams forming the pouches can be sloped instead of orthogonal with respect to the top and bottom edges of the hangers.

Referring now to FIGS. 5A-5C, the vertical mounted flexible planting system comprises a breathable, flexible, geo-textile 102 such as recycled polyester needle-punched felt, and a flexible, durable, impermeable, water retaining material 104 such as a recycled rubber, vinyl, or plastic. FIGS. 5A-5C depict five main structural elements; the breathable material 102 forming at least a portion of the front face of the hanging planter 300, an impermeable material 104 comprising the entire back portion of the hanging planter 300, an optional impermeable material 104 backing located at the bottom 704 of the pouch 406, opposing seams 404 which define in part a plant pouch 406 therebetween, and the fasteners such as grommets 402.

The impermeable material 104 is first cut into the necessary pattern and laid flat. In one embodiment, the breathable material 102 is cut to approximately ⅕$^{th}$ of the height of the impermeable material 104 and to the same width as impermeable material 104. The recycled polyester felt 102 is then fastened to the rubber or vinyl material 104 by stitching and/or bonding them together at opposing ends, for example using synthetic thread and/or an industrial strength adhesive. This combined materials form a single sheet of material that can be folded back onto itself and thereby create a pouch 406 that is, for example, approximately two-thirds of the overall height of the planting system. This newly formed pouch 406 includes three different sections; the back section and the bottom section 704 which in one embodiment, are entirely composed of the impermeable material 104, and finally the front top 706 of the pouch, which is entirely made of the breathable material 102.

To create the single pouch hanging planter (FIG. 5A) that can hold plants and planting medium, only the sides are stitched 404 and/or bonded vertically top to bottom. Finally, a grommet 402 is incorporated at the top to the seam and elongated portion 602. The grommet 402 can be fabricated from metal, ceramic or plastic to enable the plant hanger to be mounted to various vertical structures such as walls and/or fences.

The multi-pouch vertical plant hangers of FIGS. 5B and 5C are formed in a similar manner as described above with regard to the embodiment of FIGS. 4B and 4C. For example, the triple and quintuple pouch plant hangers incorporate the same process of stitching and/or bonding at evenly spaced portions along the length of the folded sheet materials. That is, the stitching 725 and/or bonding process extends from the bottom fold to the top of the hanger. As described above, the separate plant pouches $406_m$ (where "m" is an integer greater than 1) are formed with grommets 402 positioned proximate the seams at the top of the hanger for mounting purposes. In an alternative embodiment, adjacent pouches 406 can be left partially open to each other (e.g., FIG. 5(B and C)) by partial stitching 715 (FIG. 7B), thereby allowing the root systems between the individual plants to intermingle or they may be sewn completely to separate the root systems from intermingling. In this embodiment, the bonding and/or stitching extends a distance from the top of the hanger downward towards the bottom portion of the hanger, but does not extend the entire length, as illustratively shown in FIG. 7B. For example, the stitching and/or bonding can extend a distance ½ or ¾ of the entire height of the hanger. It is further noted that the use of the impermeable material in FIGS. 5A-5C is used to protect the vertical mounting surface and horizontal surfaces below the planting system from damage due to excess moisture.

Although the vertical plant hangers of the present invention are illustratively described as using at least one grommet 402 as a mounting means for securing the hanger in a vertical position relative to a horizontal surface, a person of ordinary skill in the art will appreciate that other mounting means or fasteners can be utilized. For example, hooks, bolts, loops, among other fasteners can readily be attached to the back panel for securing the hanging planter in a vertical position such as on a wall or from a ceiling.

Figure 14:
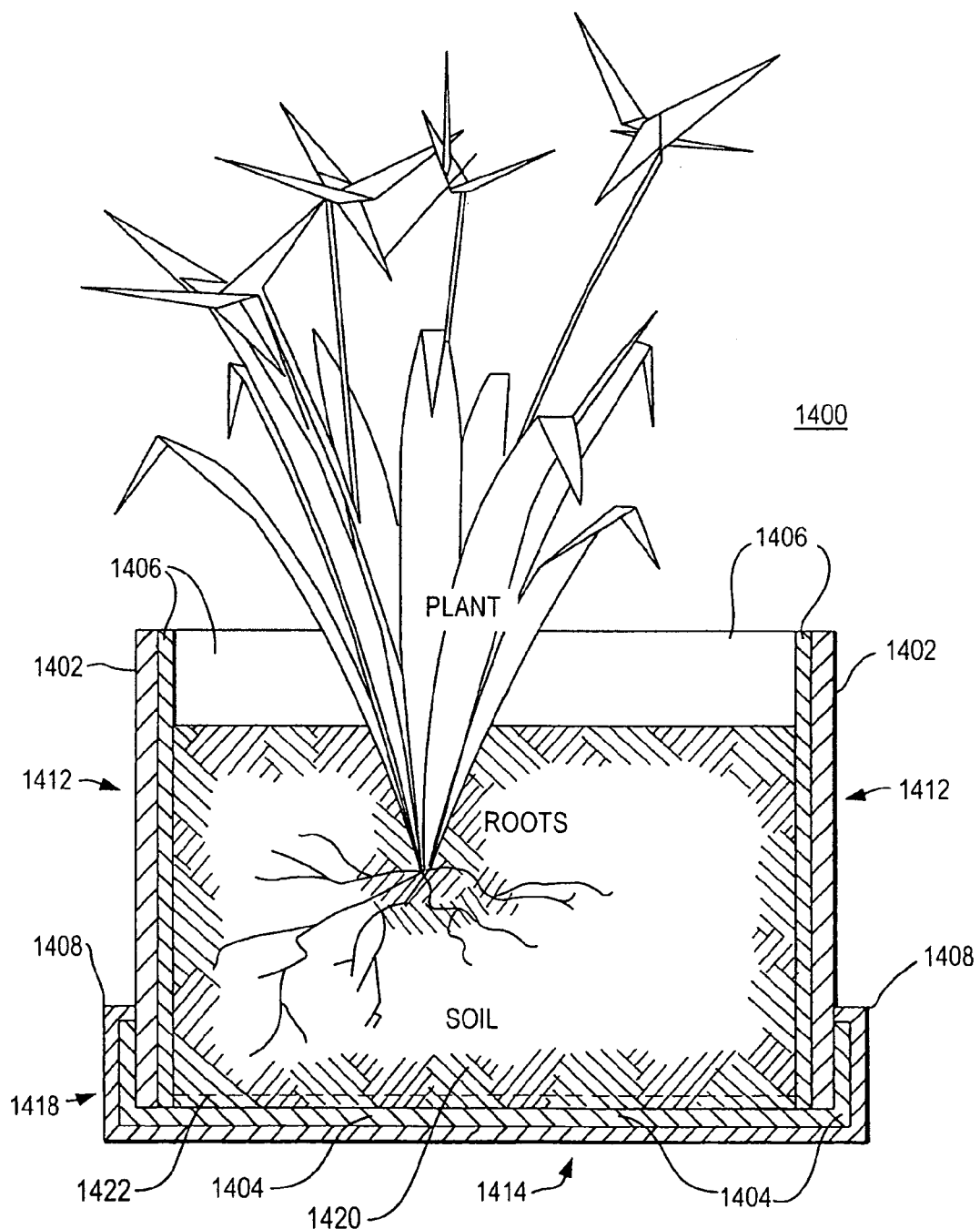
FIG. 14 is a cross-sectional view of a 4-ply flexible plant container suitable for placement on a flooring surface or ground.
Figure 15A:
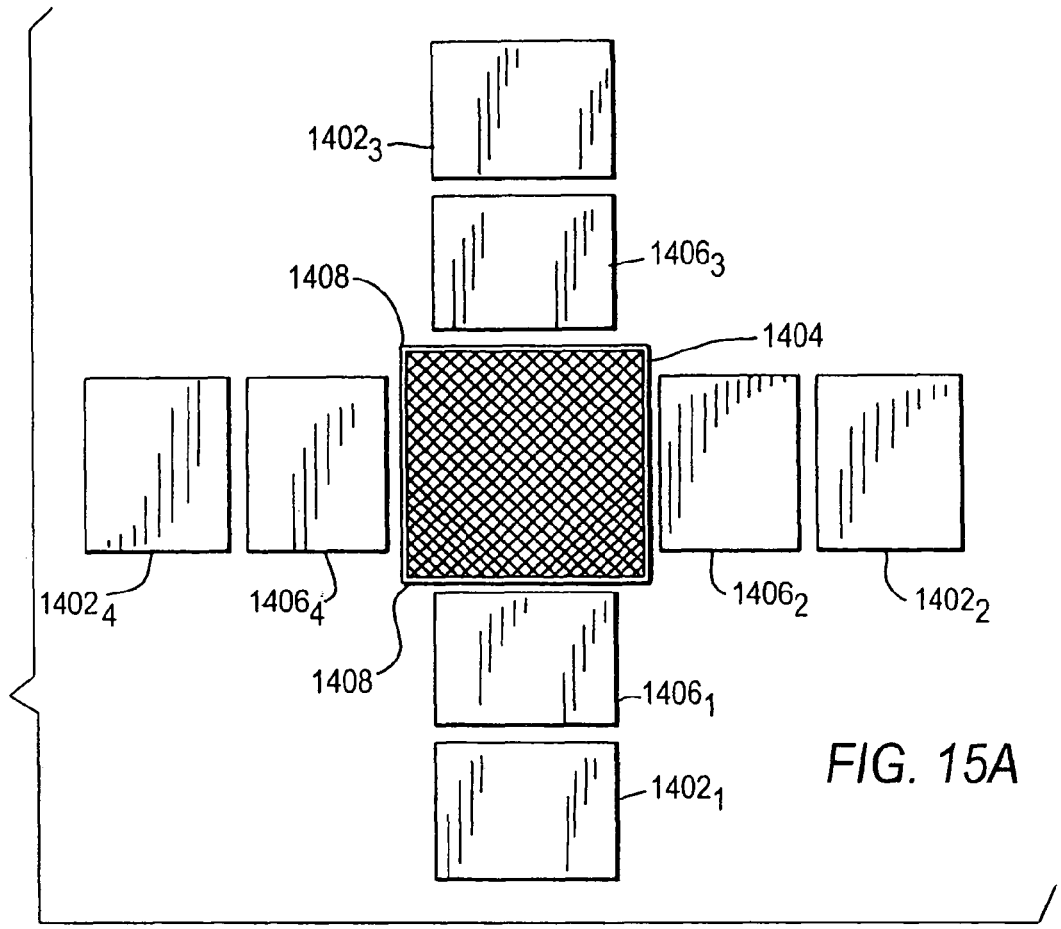
FIGS. 15A to 15C depict a flow diagram of a method for fabricating the 4-ply flexible plant container of FIG. 14.
Figure 15B:
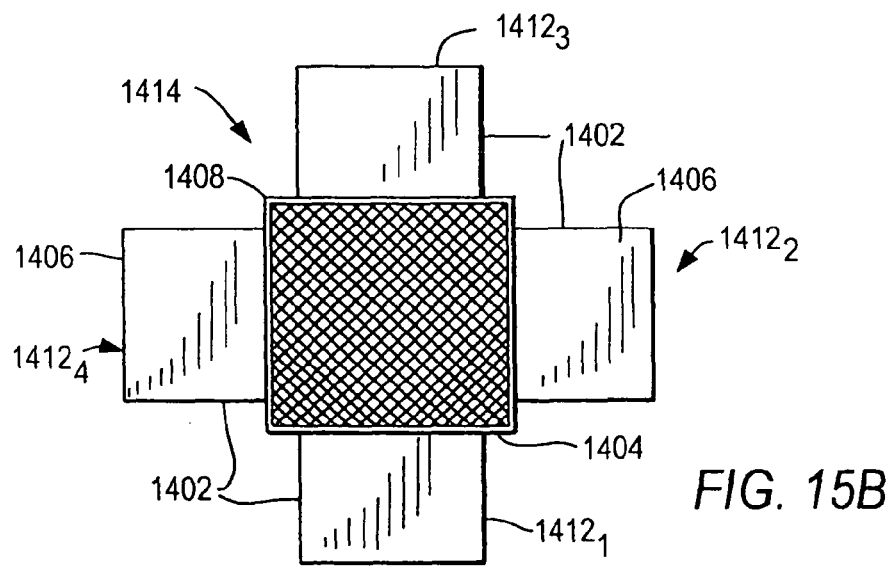
Figure 15C:
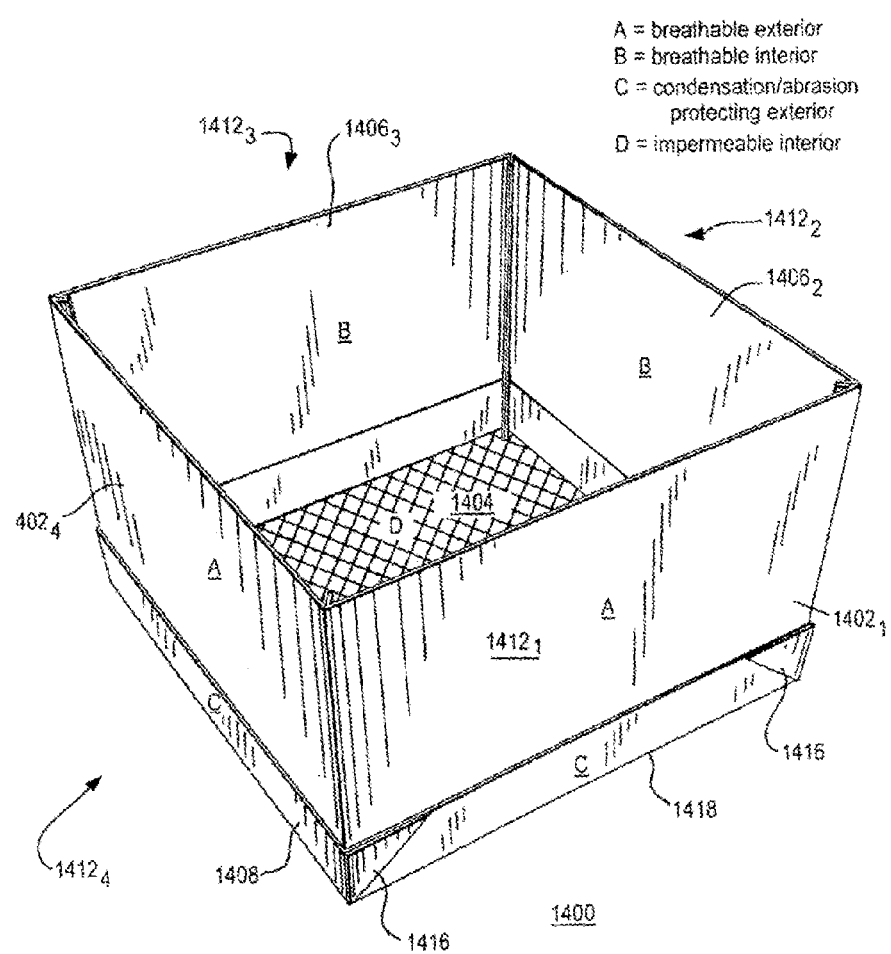

Referring to FIGS. 14 to 15C, a 4-ply flexible plant container is illustratively shown. FIG. 14 depicts a cross-sectional view of a 4-ply flexible plant container suitable for placement on a flooring surface or ground. FIGS. 15A to 15C depict a flow diagram of a method for fabricating the 4-ply flexible plant container of FIG. 14. The 4-ply flexible plant container includes two additional layers or plies of the breathable recycled polyester needle-punched felt material 102 as compared to the 2-ply plant container illustratively shown in FIGS. 1-3.

The Referring now to FIG. 14, the plant container 1400 comprises a first exterior layer 1402, a second interior layer 1406, a third condensation layer 1408, and a fourth liquid-impermeable interior layer 1404. The first exterior layer, 1402, second interior layer 1406, and third condensation layer 1408 are preferably fabricated from the breathable, flexible geo-textile, such as a recycled polyester needle-punched felt material described above with respect to FIGS. 1-13. Similarly, the fourth interior layer 1404 is preferably fabricated from the recycled rubber, vinyl, plastic or other flexible, liquid impermeable material that can be joined together by stitching and/or adhesives as also described above with respect to FIGS. 1-13.

Referring to FIGS. 15A to 15C, a flow diagram illustrating assembly of the plant container 1400 is illustratively shown. The flow diagram is directed to producing a rectangular shaped plant container. However, a person of ordinary skill in the art will appreciate that such shape is not limiting and that other shaped plant containers can be readily produced, such as oval, square, circular, polygonal and other customized shaped containers.

Referring now to FIG. 15A, four first exterior layers $1402_1$ to $1402_4$ (collectively first exterior layers 1402) are cut to a desired size and shape, and are illustratively laid out on a flat surface for assembly. Similarly, four second interior layers $1406_1$ to $1406_4$ are cut to a desired size and shape, and are illustratively laid out on a flat surface for assembly. Preferably, the second interior layers $1406_1$ to $1406_4$ (collectively second interior layers 1406) are sized and shaped to the same dimensions as the first exterior layers $1402_1$ to $1402_4$.

The fourth impermeable interior layer 1404 and the third condensation layer 1408 are also cut to a desired size and shape, such as a square. Preferably, the third condensation layer 1408 is sized larger than the fourth impermeable interior layer 1404. The excess or oversized portions form a lower portion of the sidewall and serve to provide liquid impermeable characteristics to that portion of the sidewalls of the plant container.

Referring now to FIG. 15B, each of the first exterior layers 1402 are aligned over a corresponding one of the second interior layers 1406 and each are stitched along the periphery to illustratively form four 2-ply sidewalls $1412_1$ to $1412_4$ (collectively sidewalls 1412). The lower portions of each sidewall 1412 are attached to the condensation layer 1408 and the impermeable interior layer 1404 as shown in FIGS. 14, 15B and 15C.

In particular, a lower edge of each sidewall is fastened to a corresponding peripheral edge of the fourth impermeable interior layer 1404 and the overlying third condensation layer 1408, such that the second interior layers 1406 and the fourth impermeable interior layer 1404 forms the interior sidewalls and bottom portions of the plant container 1400. Similarly, the first exterior layers 1402 and condensation layer 1408 collectively form the exterior sidewalls and external bottom portions of the plant container 1400.

Referring to FIG. 14, the sidewalls 1412 are positioned substantially normal to the 2-ply bottom portion 1414 of the container, which is formed by the third condensation layer 1408 and the fourth impermeable interior layer 1404. The peripheral edged of the 2-ply bottom portion 1414 overlaps the lower portion of each sidewall 1412 in a vertical direction such that a 4-ply portion is formed along the lower edge of the sidewall 1412. In a preferred embodiment, the external condensation layer 1408 extends over the circumferential edge of the impermeable interior layer 1404 along the exterior layers 1402 of the sidewalls 1412.

The 4-ply portion of the sidewall 1412 formed by the overlap of the 2-ply sidewalls 1412 and the 2-ply bottom portion 1414 can extend in a range of 2 inches to 6 inches, although such overlap amount is not considered limiting. Rather, persons of ordinary skill in the art will appreciate that the heights of the impermeable material 104 as measured from the bottom of the container 100 and the amount of overlap between the breathable material 102 and impermeable material 104 can vary depending on other factors such as the dimensions (e.g., height) of the sidewalls, for example, 36", 24", and 12" sidewalls to illustratively form square or rectangular shaped containers, the surface upon which the planter is to be placed, and the thickness of the breathable material 102.

With reference to FIG. 14, the moisture impermeable material 1404 that lines the bottom and lower sidewall portions of the plant container 1400 collectively forms a water-retaining portion or reservoir 1420 that is capable of retaining water without leakage. The height and width of the moisture impermeable lining material 1404 define the volume of the water-retaining portion 1420. The height of the moisture impermeable lining material relative to the overall height of the sidewall can vary depending on environmental factors such as indoor or outdoor use and climate conditions, e.g., rainfall, humidity, full exposure to the sun, among other climatic conditions. For example, the height as measured from the bottom of the container 1400 can illustratively be in a range of 1-4 inches for sidewalls 1412 having a height of 12 inches, although such heights are not to be considered limiting. The rear portion of the impermeable material 1404 can also extend upwardly to prevent moisture from wicking to the wall of the supporting structure to avoid creating a damp area behind the planter.

Illustratively, a plant container 1400 formed with a twelve (12) inch sidewall 1412 can have the impermeable lining 1404 extend up the sidewalls a sufficient height (e.g., 3-4 inches) to form larger reservoirs 1420, which are often desirable for environments having arid climates where the humidity is low. In this manner, the amount of water in the reservoir is greater, and it is retained longer to be absorbed through the soil for feeding the plant roots. Similarly, plant containers 1400 having impermeable linings 1404 with greater heights are often suitable for use indoors to protect against overflow or leakage during watering activity. Alternatively, plant containers 1400 having impermeable linings 1404 adjacent the sidewalls 1412 with lower heights (e.g., 1-2 inches) form smaller reservoirs 1420, which are often suitable for wetter climates or outdoor usage such that excess water (e.g., from heavy rainfall) can flow out through the breathable felt material 1402 and drip onto the ground, thereby helping to prevent root rot. The volume of the reservoir 1420 can also be controlled or adjusted by including gravel or other water-impermeable materials of sufficient size along the bottom interior surface of the plant container 1400 to prevent the soil thereabove from compacting and filling in the portion forming the reservoir 1420.

In an alternative embodiment, an additional bottom layer 1422 (drawn in phantom in FIG. 14) formed from the breathable felt material 1402 can be provided above the impermeable lining material 1404 to define the bottom interior surface of the plant container 1400. The additional bottom layer of the breathable felt material 1422 forms the innermost bottom interior layer which comes into contact with the soil (or gravel). The additional bottom felt material layer 1422 and the interior sidewall 1406 formed by the breathable felt material 1402 can collectively serve as a wick to draw water from the reservoir 1420 upward into the soil to enable the plant roots to thereby continuously provide water and nutrients to the plants. Moreover, any excess water that may collect in the planter 1400, illustratively from rain or overwatering, is quickly drawn from the reservoir 1420 by the interior breathable felt material 1422, 1406 to sidewall areas 1412 of the breathable material 1602 that are not adjacent to the impermeable lining material 1404. In this manner, evaporation of the any excess water in the reservoir 1420 is enhanced and accelerated by utilizing the sidewall areas of the breathable material that are exposed to the surrounding air. Accordingly, the wicking action of the interior breathable felt material 1406, 1422 eliminates the need to provide drainage holes in the bottom of the floor planter 1400 and helps to prevent root rot.

The 4-plies along the sidewall 1412 are fastened together using thread in a predetermined stitching pattern and/or an adhesive, in a similar manner as described above with respect to the embodiments of FIGS. 1-3. The vertical edges of the sidewalls are also fastened together by a predetermined stitching pattern and/or an adhesive, as also described above with respect to the embodiments of FIGS. 1-3. In particular, a seam can be formed on the interior of the container 1400. In this manner, the seam can be relatively hidden from view. Alternatively, the seam can be formed on the exterior of the container 1400 and be in plain sight.

Further construction of the 4-ply flexible plant container is similar to the embodiments described above with respect to FIGS. 1-3. For example, in one embodiment, the tab portions 1416 are formed on the bottom portion 1414 when the lower sidewall portion is folded upward. In particular, since the size of the 2-ply bottom portion 1414 has a circumference that is larger than the lengths of the sidewalls 1412. At the corners of the container 1400, when the lower edges of the bottom portion 1414 are folded upwards to form the lower impermeable sidewall portion 1418 of the container 1400, a triangular tab 1416 is formed by the excess material. In one embodiment, opposing surfaces of the triangular tab 1416 are bonded and/or stitched together so as to remain extending outwards, as shown in FIGS. 1 and 2. Alternatively, and preferably, the triangular tab portions 1416 are first bonded and/or stitched together and then folded over and again bonded/stitched to the sidewalls 1412, as illustratively shown in FIG. 15C. Alternatively, the tab 1416 is folded over to the lower sidewall portion 1418 and then simply bonded/stitched thereto.

The first exterior layer, 1402, second interior layer 1404, and third condensation layer 1408 which are preferably fabricated from the breathable, flexible recycled polyester needle-punched felt material 1402 can have a thickness of $1/32$" to $1/4$" inches, although such dimensions are not limiting. In one embodiment, the 2-ply sidewalls 1412 are $1/16$ inch thick providing a total sidewall thickness of $1/8$ inch. Similarly, the impermeable interior layer 1404 can also have a thickness of $1/32$ to $1/4$ inches, although such dimensions are not limiting. In a preferred embodiment, the 2-ply bottom portion includes a $1/16^{th}$ inch thick condensation layer 1406 and a $1/8$th inch thick impermeable interior layer 1404 to form a $3/16$ inch thick 2-ply bottom portion 1414.

It is noted that changes in temperature or humidity can cause excess condensation to form between the exterior portion of the impermeable layer 1404 and the unprotected household surface (e.g., furniture, floor or wall). To alleviate this issue, the external condensation layer 1408 is provided over the impermeable layer 1404 to absorb any excess condensation thereon. Further, since the condensation layer 1408 is fabricated from the soft, flexible polyester needle-punched felt material essentially having a low coefficient of friction, this external layer 1408 formed on the bottom portion 1414 of the plant container 1400 serves as a soft anti-abrasive material that prevents scratching, for example, of a floor or table surface when slidably moving the plant container 1400.

As noted above, the 2-ply sidewalls are formed from the two plies of polyester needle-punched felt material, where one layer forms the exterior portion 1402 and the other layer forms the interior portion 1406 of the sidewall 1412 of the container 1400. Advantageously, the 2-ply sidewalls 1412 provide additional structural support, allow for two-tone coloration schemes, and readily allow for the placement of the impermeably layer 1404 therebetween.

Although the present embodiment of FIGS. 14-15C is shown with four separate sidewalls, such quantity is not limiting. Rather, a person of ordinary skill in the art will appreciate that a lesser number (e.g., a single or pair of sidewalls) or greater number of sidewalls can be utilized to form the plant container.

Referring to FIGS. 16-19B, a vertically mountable 3-ply hanging planter 1600 having one or more pouches is illustratively shown. The 3-ply plant hanger embodiment differs from the 2-ply embodiment of FIG. 5 in that this latter embodiment includes an interior layer and an exterior layer that are both fabricated the breathable geo textile material (e.g., the polyester needle-punched felt material). Further, a liquid impermeable layer is inserted between at least a portion of the interior and exterior layers.

Figure 16:
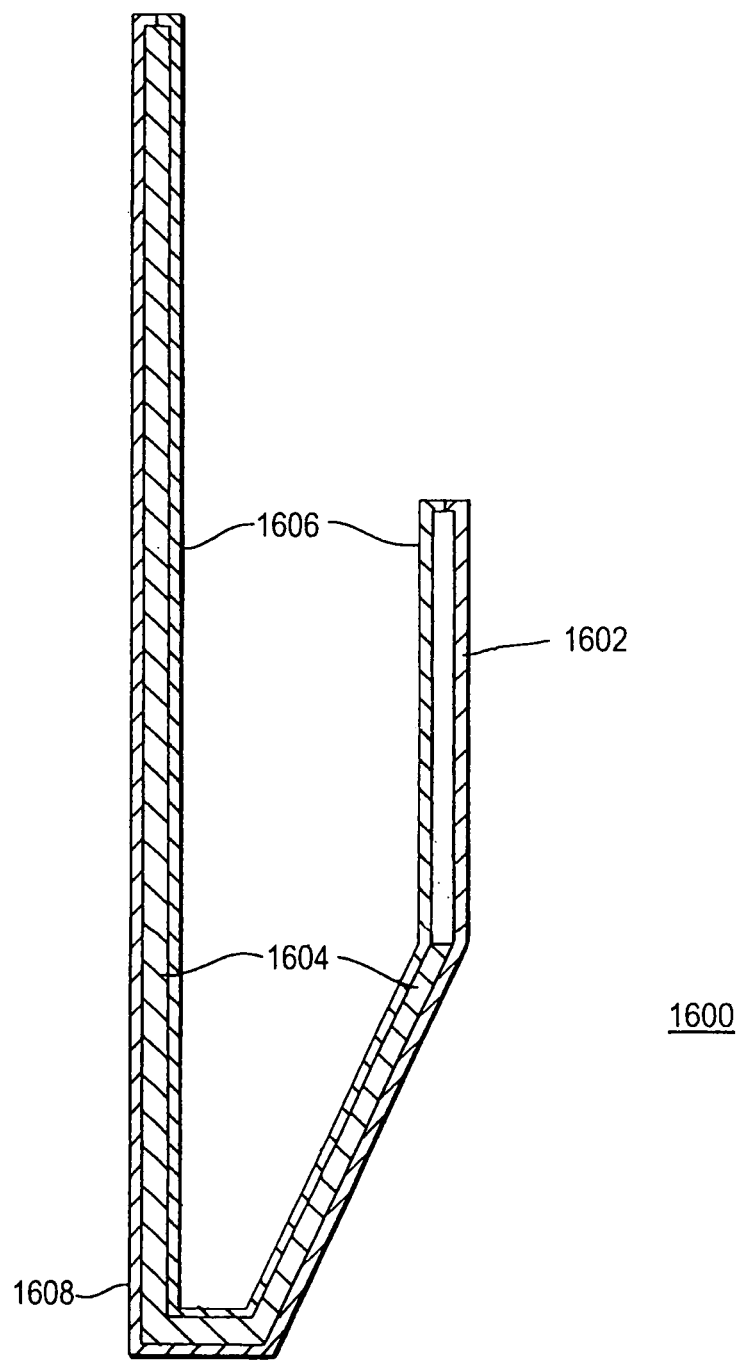
FIG. 16 is a cross-sectional view of a vertically mountable 3-ply plant hanger.
Figure 18:
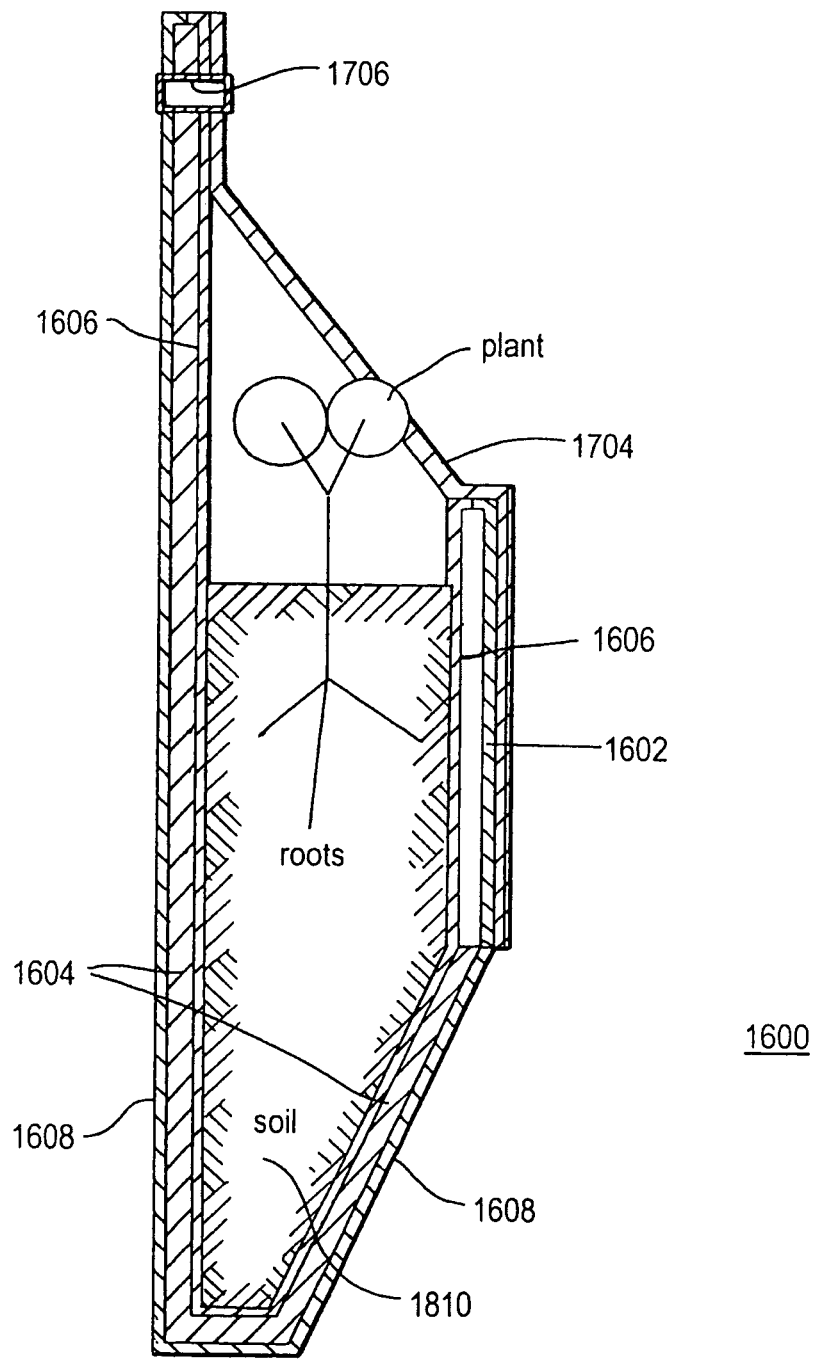
FIG. 18 is a cross-sectional view of a vertically mountable 3-ply hanging planter after completion of the fabrication method of FIGS. 17A-17F.
Figure 19A:
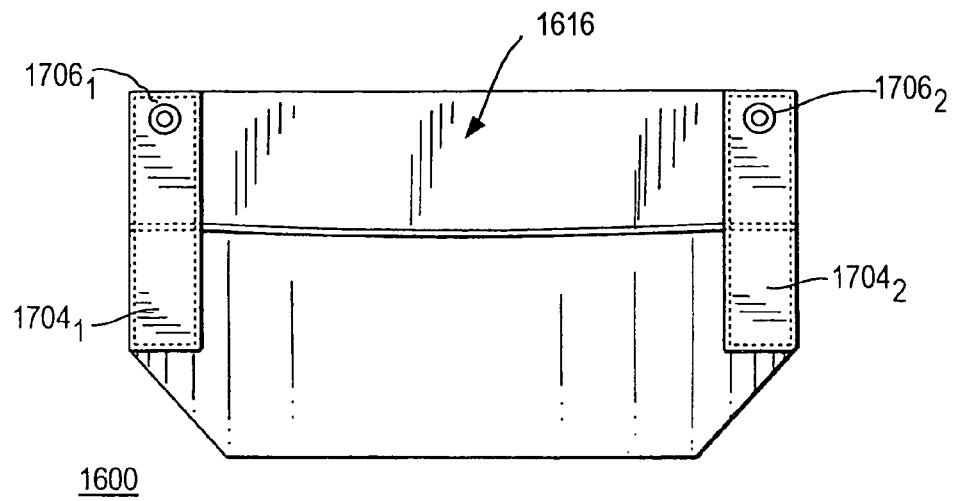
FIGS. 19A and 19B are front perspective views illustrating a vertically mountable 3-ply hanging planter having a single pouch and a vertically mountable 3-ply hanging planter having multiple pouches fabricated in accordance with the method of FIGS. 17A to 17F.
Figure 19B:
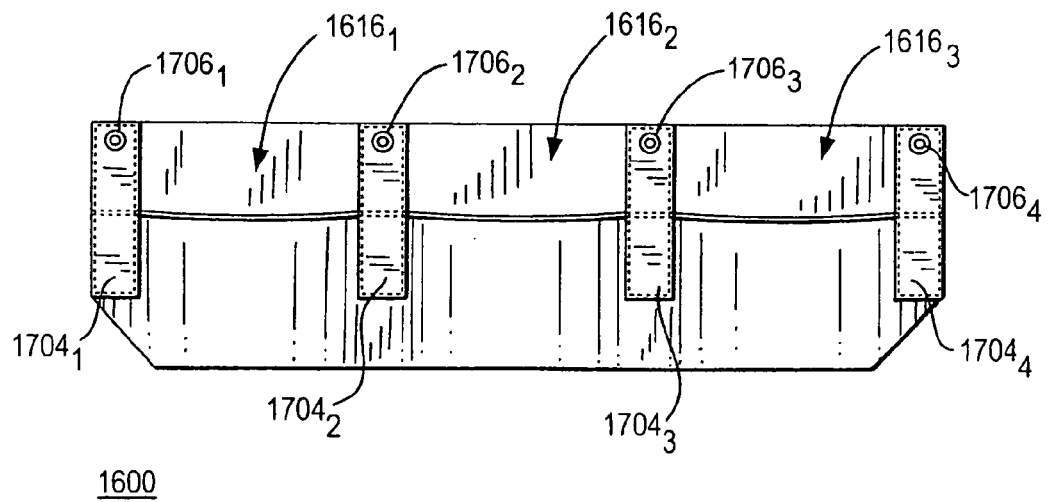

FIG. 16 depicts a cross-sectional view of a vertically mountable 3-ply plant hanger 1600. FIGS. 17A-17F collectively depict a flow diagram for fabricating the plant hanger of FIG. 16. FIG. 18 is a cross-sectional view of the vertically mountable 3-ply plant hanger 1600 after completion of the process of FIGS. 17A-17F. FIGS. 19A and 19B depict different front perspective views of a finished single pouch and multi-pouch hanger.

Referring to FIGS. 16 and 17A-17F, a first exterior layer 1602, a second interior layer 1606, and a third liquid-impermeable interior layer 1604 are shown. The first exterior layer 1602 and second interior layer 1606 are preferably fabricated from the breathable, flexible geo-textile, such as a recycled polyester needle-punched felt material described above with respect to FIGS. 1-15. Similarly, the third impermeable interior layer 1604 is preferably fabricated from the recycled rubber, vinyl, plastic or other flexible, liquid impermeable material that can be joined together by stitching and/or adhesives as also described above with respect to FIGS. 1-15. As described in greater detail below, a portion of the first exterior layer 1602 laying adjacent to the third impermeable interior layer 1604 forms and serves as a condensation layer 1408.

Figure 17A:
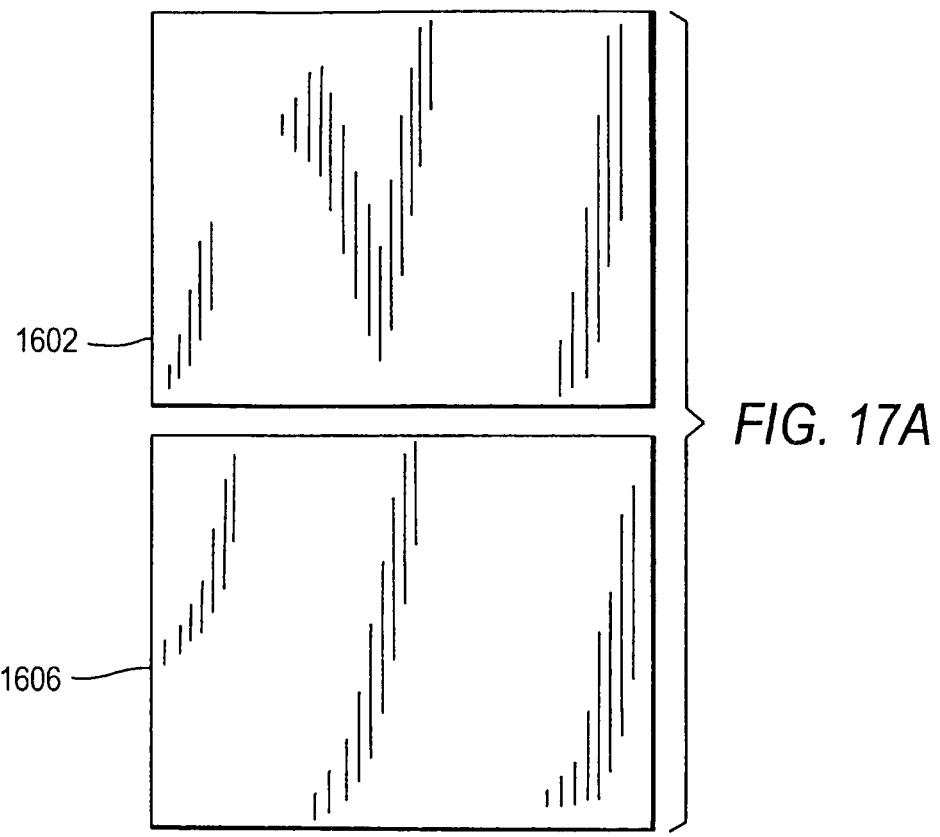
FIGS. 17A to 17F depict a flow diagram of a method for fabricating the vertically mountable 3-ply hanging planter of FIG. 16.

Referring to FIG. 17A, a first exterior layer 1602 and a second interior layer 1606 are both cut to a matching predetermined size and shape. The width and height of the layers is determined based on the number of pouches being formed. For example, a hanging planter having a single pouch may have a width of 15 inches and a height of 12 inches, while a hanging planter having three pouches may have a width of 36 or 48 inches with a height of 12 or 15 inches.

Figure 17B:
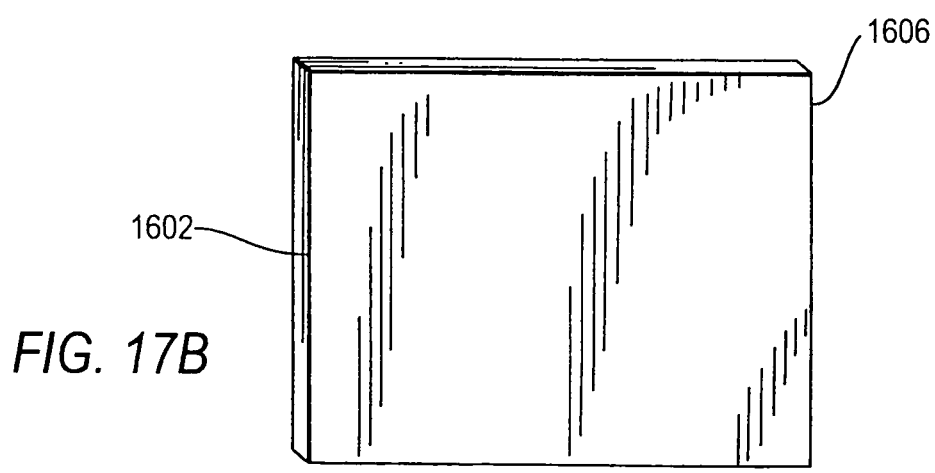

Referring to FIG. 17B, the second interior layer 1606 is placed adjacent to the first exterior layer 1602 and the edges thereof are fastened together on three sides with one side open to form a "pillow sham" like structure. Preferably the lateral and bottom adjacent edges of the two layers 1602 and 1606 are sewn together and/or bonded using an industrial strength water impermeable sealant or adhesive. The edges are preferably sewn using a polyester thread having a size/weight of Tex 30 to Tex 50, as described above with respect to the embodiments of FIGS. 1-15. The two polyester needle-punched felt layers 1602 and 1606 are initially secured together along three sides or edges to form an opening on one edge, which allows for the insertion of the third impermeable interior layer 1604 therebetween. It is noted that a person of ordinary skill in the art will appreciate that a single elongated layer of the breathable material can alternatively be folded over and joined along the edges to form the pouch instead of the using the two separate layers 1602 and 1606.

As is apparent from the drawings, a water-retaining portion or reservoir 1810 is formed at the bottom of the pouch by the opposing interior front and rear impermeable layers 1604. The height and width of the front portion of the impermeable lining layer 1604 defines the volume of the water-retaining portion, and an increase or decrease in the height can be used to define the volume of the reservoir 1810. The determination of the volume (e.g., height) of the reservoir 1810 can be based on environmental factors, such as the location (e.g., indoor or outdoor) of the hanging planter and climatic conditions. Illustratively, for wetter environments and/or outdoor use, the front portion of the impermeable lining layer 1604 can optionally be lower relative to the bottom of the planter 1600 to reduce the water-retaining portion of the reservoir 1810 and thereby enable excess water (e.g., rainfall) to overflow and be dispersed through the felt material 1602, evaporate through the breathable felt material, or drip down to the ground below. For example, in wetter climates and outdoor use the height of the impermeable layer 1604 along the front of the planter 1600 can be in a range of nil (zero) to ⅓ of the overall height of the pouch, although such range is not to be considered limiting.

Alternatively, for use in hot and/or drier environments as well as indoors, the front portion of the impermeable lining layer 1604 can optionally be higher relative to the bottom of the pouch to increase the volume of the water-retaining portion 1810 in order to retain more of the water. For example, in drier climates or for indoor use and where relative humidity is low, the height of the impermeable lining layer 1604 along the front of the planter 1600 can be in a range of ⅕ to ⅓ of the overall height of the pouch, although such range is not considered limiting. A person of ordinary skill in the art will appreciate that the height of the impermeable material can be configured to adjust the size of the reservoir according to local environmental conditions and usage for any of the hanging planter embodiments described and shown herein. Advantageously, the impermeable lining layer (barrier) 1604 helps conserve water and keep the soil's nutrients and/or fertilizer in the pouches.

Further, the interior breathable layer 1606 can serve as a wick to draw water from the water-retaining portion 1810 upward into the soil and to the plant roots to thereby continuously provide water and nutrients to the plants. Moreover, any excess water that may collect in the pouches, illustratively from rain or overwatering, is quickly drawn from the reservoir 1810 by the interior breathable layer 1606 to portions of the breathable material 1602 that are not positioned adjacent to the impermeable lining layer 1604, and to thereby enhance evaporation of the excess water and prevent root rot. In this manner, the wicking action of the interior breathable layer 1606 eliminates the need for providing drainage holes in the bottom of the vertical hanging planter 1600.

Figure 20:
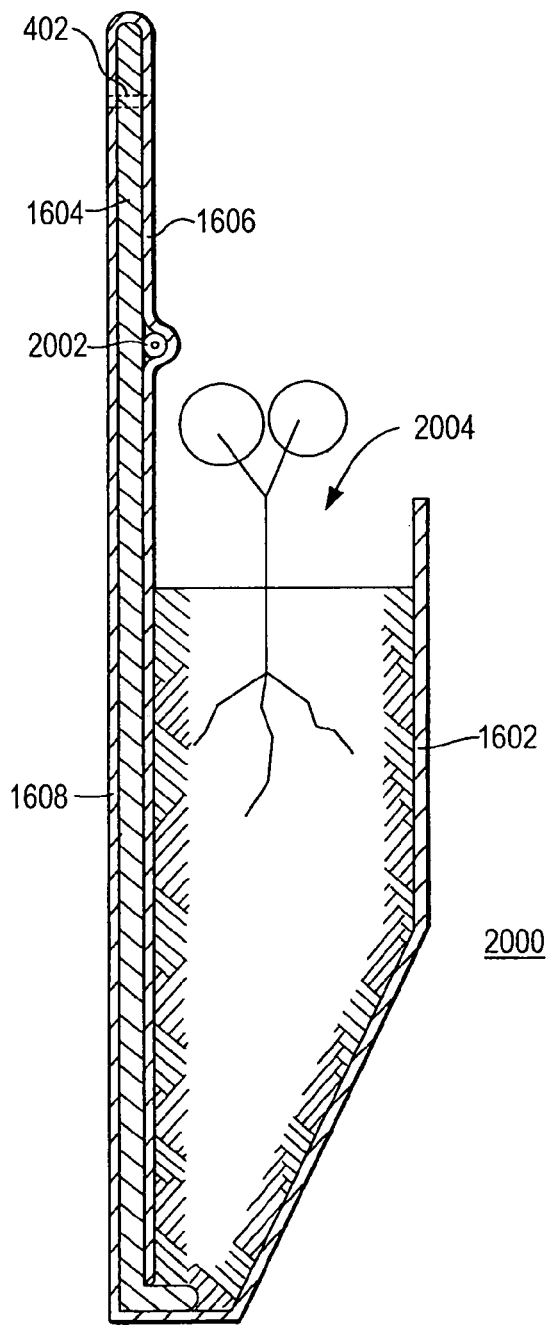
FIG. 20 is a cross-sectional view of another embodiment of the vertically mountable hanging planter illustrating an interior fabric liner that wicks moisture to and from the plant soil.
Figure 21:
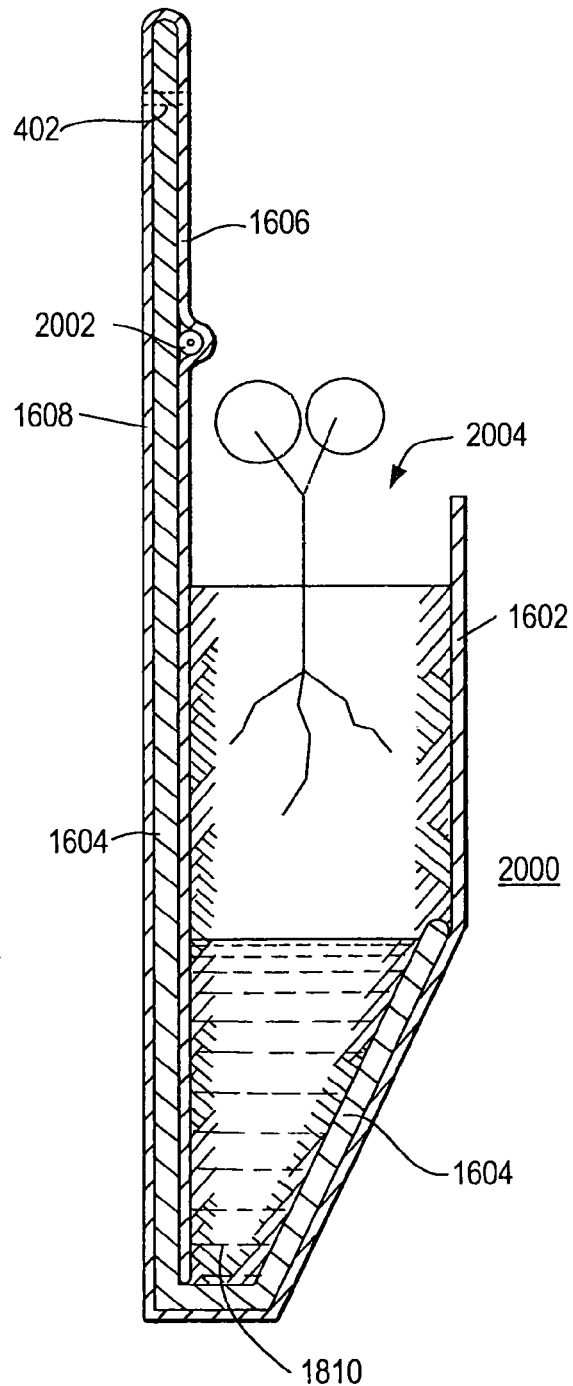
FIG. 21 is a cross-sectional view of yet another embodiment of the vertically mountable hanging planter illustrating a water-impermeable layer that forms a reservoir at the bottom of the pouch of the hanging planter.

Referring to FIGS. 20 and 21, the vertical hanging planter 2000 can be formed from a single sheet of the breathable felt material that is folded over itself at the bottom to form a rear panel 1608, a front panel 1602 and the pouch portion 2004 defined therebetween in a similar manner as described above with respect to FIGS. 4A-5C. The water-impermeable lining 1604 is positioned along the interior of the pouch 2004 and preferably extends from proximate the top portion of the planter 2000 and downward toward at least the bottom interior portion of the pouch 2004, as shown in FIG. 20. The water-impermeable lining 1604 preferably extends approximately the same width of the pouch 2004, although a person of ordinary skill in the art will appreciate that the water-impermeable lining 1604 can have a smaller width than the width of the pouch 2004. Further, since the front portion of the pouch 2004 is formed by the breathable felt material, the soil can be aerated through the felt material which helps prevent the plants from becoming root bound. The embodiment of FIG. 20 is preferably used outdoors, as excess rain water can easily drip out of the pouch 2004, although such use is not limiting.

Alternatively, the water-impermeable lining 1604 continues along the bottom interior portion and is folded or curves upward along the interior front wall forming the pouch 2004, as shown in FIG. 21. In this latter embodiment, the water-impermeable lining 1604 defines the water-retaining portion or reservoir 1810, which can advantageously be used to retain additional water in arid environments, as discussed above. The embodiment of FIG. 21 is preferably used indoors, as the reservoir 1810 helps prevent excess water from undesirably dripping out of the pouch 2004 to surfaces below, although such use is not limiting.

A tongue or front lining 1606 fabricated from the breathable felt material 1602 is positioned adjacent to and over the interior water-impermeable lining 1604 and extends from the top of the planter 2000 downward to proximate the bottom portion of the pouch 2004, as shown in FIGS. 20 and 21. The length of the front lining 1606 is at least sufficient to extend below the top surface of the soil. Preferably, the front lining 1606 extends the width of the pouch 2004 and covers the upper and mid-portions of the interior water-impermeable lining 1604, although the width of the front lining 1606 is not limiting. In the embodiment shown in FIGS. 20 and 21, the front lining 1606 is formed from the same single sheet of breathable felt material and folded over the water-impermeable lining 1604. Alternatively, the front lining 1606 can be fabricated from a separate sheet of breathable felt material. The front lining 1606 is used to wick or draw water to or from the soil or the reservoir 1810 to help provide moisture to the roots of the plants, as well as wick away any excess water in the reservoir 1810 to help prevent root rot, as described above.

Figure 22:
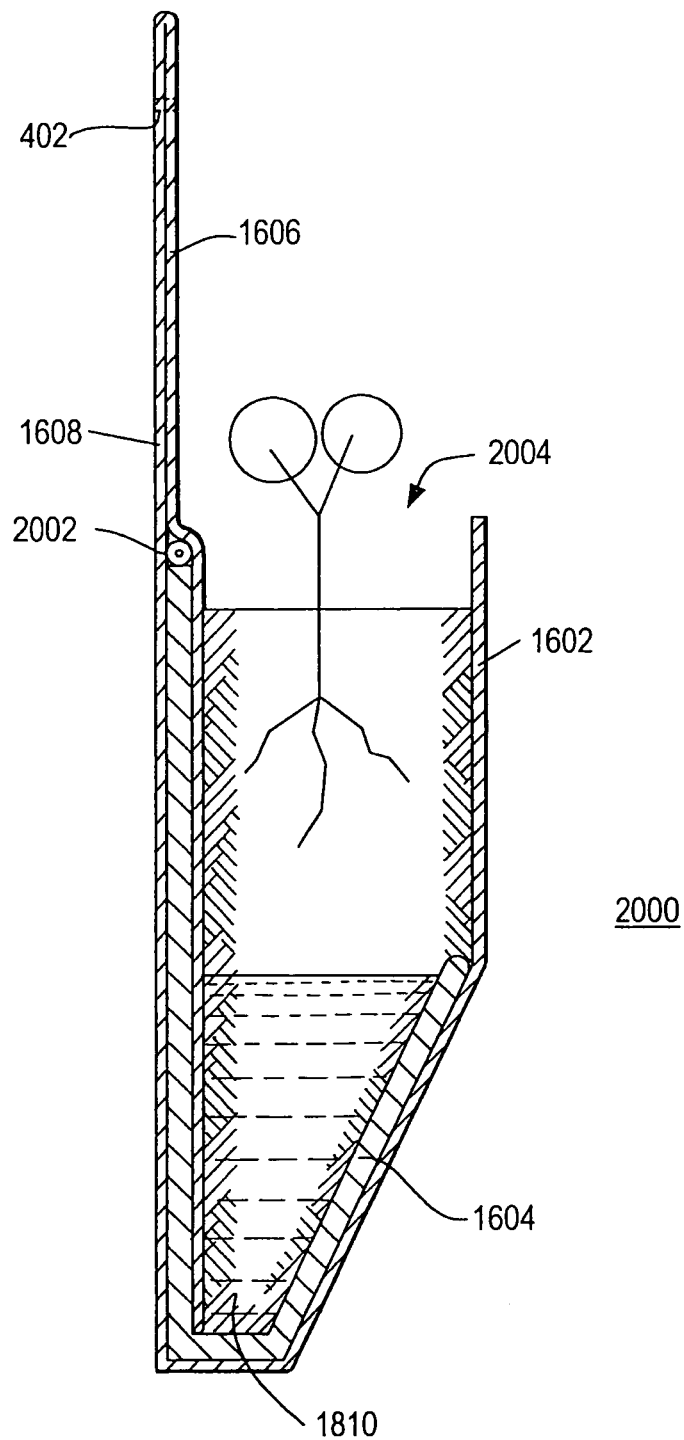
FIG. 22 is a cross-sectional view of still another embodiment of the vertically mountable hanging planter illustrating a water-impermeable layer that forms a reservoir at the bottom of the pouch of the hanging planter.

Referring to FIG. 22, the water-impermeable liner 1604 covers only a bottom portion along the interior of the pouch 2004. In this embodiment, the front lining 1606 and rear panel 1608 are positioned adjacent to each other at the top edge, and the bottom of the front lining 1606 overlaps a portion of the water-impermeable liner 1604. In this embodiment, the front lining 1606 and rear panel 1608 collectively wick excess water from the reservoir 1810. This embodiment is suitable for placement along vertical structures such as fences or by suspension from ceilings, which would not hinder evaporation through a damp rear panel 1608.

As shown in FIGS. 20-22, a hydration drip tube 2002 can be positioned between the water-impermeable lining 1604 and the front lining 1606 to provided drip hydration to the soil in the pouches 2004. Further, gravel or other water-impermeable materials can be placed along the bottom of the pouch to prevent the soil from compacting in the reservoir 1810 in a manner similar to that described above with respect to the plant container 1400.

Preferably, watering of the plant is performed by applying water directly to the front lining 1606, as opposed to directly watering the soil. As shown in FIGS. 20-22, the hydration drip tube 2002 provides water droplets or a mist to the front lining 1606. In this manner, the front lining 1606 absorbs the water and carries it down to the soil and roots of the plant. In the event of over-watering, the small reservoir 1810 accumulates the excess water at the bottom of the pouch 2004. When watering from the drip tube 2002 is not provided, the front lining 1606 will continue to wick the excess water from the reservoir 1810 to the roots of the plant. In addition, any excess water is able to evaporate out of the breathable felt material on the sides of the vertical hanging planter.

Referring now to FIG. 16, the third impermeable interior layer 1604 is cut to a slightly less width than the first exterior layer 1602 and the second interior layer 1606. In this manner, the third impermeable interior layer 1604 can be readily inserted into the opening of the pillow sham configuration of the two layers. Furthermore, the impermeable interior layer 1604 will not be visible to the viewer.

In one embodiment, the height of the third impermeable interior layer 1604 is less than the height of the first exterior layer 1602 and the second interior layer 1606. Preferably the height of the third impermeable interior layer 1604 is approximately ⅔ of the height of the first exterior layer 1602 and the second interior layer 1606, although such height is not limiting. In this manner, two-thirds of the two breathable first and second layers 1602 and 1606 are separated from each other, and this portion of the plant hanger is no longer breathable in terms of allowing moisture to escape therethrough. However, one-third interior of the plant hanger remains breathable, and thereby allows for the passage of moisture.

Referring again to FIG. 16, the third impermeable interior layer 1604 is preferably positioned along the rear bottom and lower front portions of the plant hanger 1600. The upper front side of the plant hanger does not have the impermeable interior layer 1604 inserted between the first exterior and second interior layers 1602 and 1606. Accordingly, water and moisture cannot permeate or seep out of the hanging planter in the areas where the impermeable layer 1604 is located. Rather, the water and moisture can only permeate through the front side portion of the hanging planter where the impermeable layer 1604 is not present.

Figure 17C:
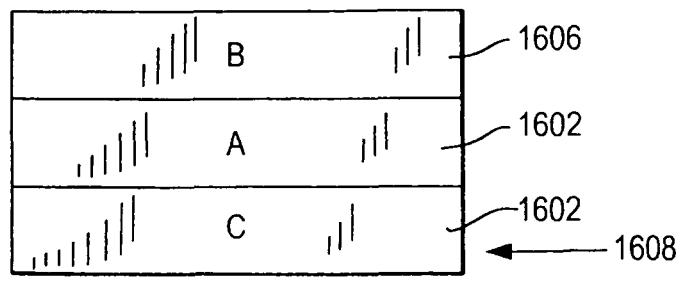

Referring to FIG. 17C, the front view of the hanging planter is shown in a folded state. The upper third portion ("B") is a portion of the rear panel wall formed by the interior layer 1606, and the middle portion ("A") is formed by the upper portion of the front panel wall formed by the exterior layer 1602. The lower portion ("C") is formed by the lower portion of the front panel wall formed by the exterior layer 1602 and serves as a condensation/anti-abrasion layer 1608.

Figure 17D:
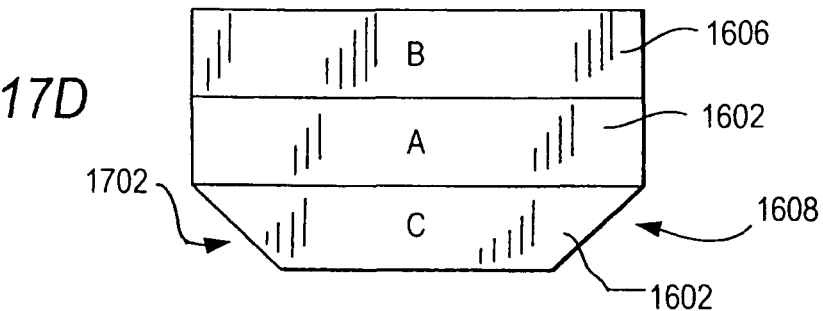
Figure 17E:
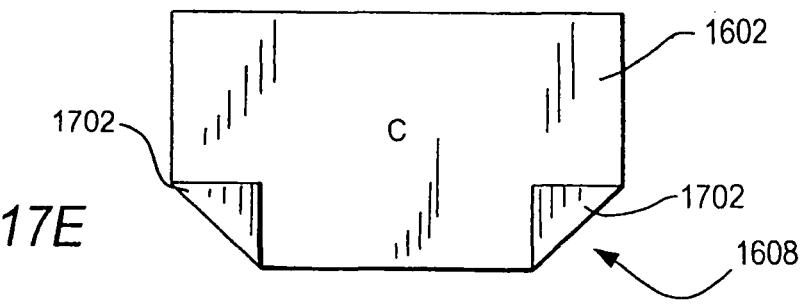

Referring to FIG. 17D, the lower corners 1702 of the lower front panel can be folded backwards to form a triangle, as shown by the rear view of the hanging planter 1600 in FIG. 17E. The triangular "tabs" 1702 are fastened to the rear portion by sewing and/or bonding them in a similar manner described above. The triangular tabs are formed and secured to the rear portion to prevent excessive leakage from the lower corners, strengthen the bottom of the plant hanger, and for aesthetic purposes.

Figure 17F:
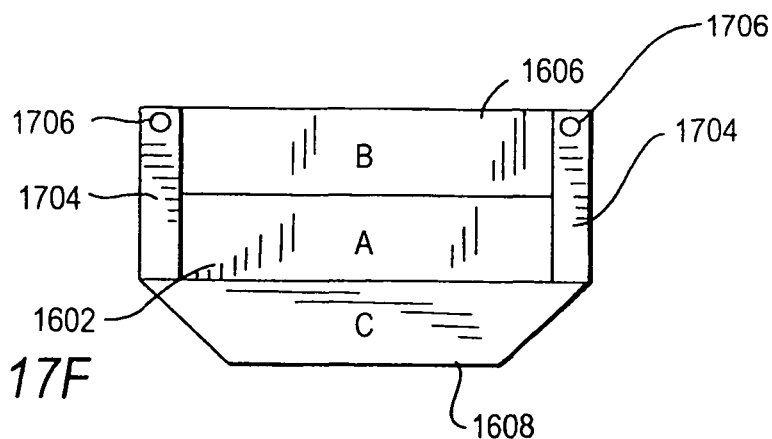

Referring to FIGS. 17F and 18, an edge reinforcement layer 1704 is attached to each opposing side of the plant hanger. The edge reinforcement layers 1704 are fabricated from the breathable material, such as the polyester needle-punched felt material, and are fastened by stitching and/or an adhesive in a similar manner as described above. The edge layers 1704 provide structural reinforcement to the edges of the plant hanger. Although the pair of edge layers 1704 are illustratively shown on the front side of the plant hanger, a person of ordinary skill in the art will appreciate that the can also be provided on the rear side of the hanging planter or folded over the sides of the hanging planter to provide structural reinforcement on both the front and rear edges of the hanger 1600.

Mounting means or fasteners are provided to enable a user to mount, hang or generally support the plant hanger is a vertical position relative to ground. In a preferred embodiment, at least one pair of grommets 1706 is attached to the sides of the plant hanger. Referring to FIG. 17F, the grommets 1706 are positioned proximate the upper top corners of the single pouch plant hanger. Referring to FIG. 18, the grommets 1706 extend from the reinforcement layer 1704 on the front side and through the second interior layer 1606, through the third liquid-impermeable interior layer 1604, and through the condensation layer 1408. The grommets 1706 can be fabricated from any suitable material for supporting the weight of the hanger, such as metal, plastics, or ceramics. A person of ordinary skill in the art will appreciate that other fasteners can be utilized to support and/or mount the plant hanger in a vertical plane, such as along a sidewall of a building, on a fence or wall, among other structures. For example, a hook, bolt, strap, wire or other conventional fastener or mounting means can be utilized to mount, hang or generally support the plant hanger 1600 in a vertical orientation over a floor or ground surface.

Referring to FIG. 19A, a hanging planter having a single pouch is shown filled with soil. FIG. 19B illustrates a hanging planter having multiple pouches (e.g., three pouches). In this multiple-pouch embodiment, additional reinforcement layers 1704 and grommets 1706 are provided at the lateral ends of each pouch. For example, in FIG. 19B, the first pouch $1616_1$ has reinforcement layers $1704_1$ and $1704_2$ positioned at its opposing ends, the second pouch $1616_2$ has reinforcement layers $1704_2$ and $1704_3$ positioned at its opposing ends, and the third pouch $1616_3$ has reinforcement layers $1704_3$ and $1704_4$ positioned at its opposing ends. Similarly, the first pouch $1616_1$ has grommets $1706_1$ and $1706_2$ positioned at its opposing top corners, the second pouch $1616_2$ has grommets $1706_2$ and $1706_3$ positioned at its opposing top corners, and the third pouch $1616_3$ has grommets $1706_3$ and $1706_4$ positioned at its opposing top corners.

Advantageously, the vertically mountable hanging planter 1600 of the present invention can be hung from most vertical surfaces to enhance the beauty of the surroundings, while promoting plant growth with minimal risk to disease and root rot. The arrangement helps beautify the environment in a manner that is environmentally safe, low maintenance, and inexpensive to produce and install.

While the foregoing is directed to embodiments of the present invention, other and further embodiments of the invention may be devised without departing from the basic scope thereof, and the scope thereof is determined by the claims that follow.

We claim:

1. A plant container comprising:
    at least one sidewall formed by a first sidewall sheet fabricated from a geo-textile material that is air and moisture permeable and comprising a polyester needle-punched felt having soft, breathable and flexible characteristics, the at least one sidewall of the first sidewall sheet having opposing ends that are joined together; and
    a first bottom sheet comprising a base portion and a lower sidewall section extending upwards from the base portion, wherein:
        the first bottom sheet is fabricated from a water impermeable material; and
        an upper edge of said lower sidewall section of said first bottom sheet being joined to an exterior bottom portion of said first sidewall sheet at a distance from the base portion, wherein the first sidewall and the first bottom sheet form an enclosure with:

an open top portion;
a reservoir along a bottom portion of the enclosure extending the distance from said base portion to an interior bottom portion of said first sidewall sheet; and
a breathable portion disposed between the reservoir and the open top.

2. The plant container of claim 1, wherein the bottom portion of the first sidewall sheet overlaps a top portion of the first bottom sheet and said first sidewall and bottom sheets are joined by at least one of stitching, adhesive bonding, rivets, and a releasable fastener.

3. The plant container of claim 1, wherein the at least one sidewall comprises a plurality of sidewall sections, the plurality of sidewall sections each having opposing ends, wherein adjacent sidewall section ends are joined together to form a secure seam therebetween.

4. The plant container of claim 3, wherein one or more seams are joined by at least one of stitching, adhesive bonding substance, and a releasable fastener.

5. The plant container of claim 3, wherein the seams extend vertically on an interior portion of the plant container.

6. The plant container of claim 3, wherein the seams extend vertically on an exterior portion of the plant container.

7. The plant container of claim 3, wherein the plurality of sidewall sections form a polygonal shaped structure.

8. The plant container of claim 1, wherein the water first bottom sheet is fabricated from a material selected from the group consisting of rubber, synthetic rubber, vinyl and plastic.

9. The plant container of claim 1, wherein the first sidewall sheet has a thickness in a range of 1/32 to 3/4 inches.

10. The plant container of claim 1, wherein the first bottom sheet has a thickness in a range of 1/32 to 3/4 inches.

11. The plant container of claim 1, wherein the first sidewall sheet has a density in a range of 6.3 and 7.7 ounces/square yard.

12. The plant container of claim 1, wherein the first sidewall sheet has a density in a range of 13.0 and 17.5 ounces/square yard.

13. The plant container of claim 1, wherein the sidewall opposing ends are joined together with rivets.

14. The plant container of claim 1, wherein at least one exterior sidewall is formed from the first sidewall sheet fabricated from a geo-textile material, said plant container further comprising:
at least one interior sidewall formed from a second sidewall sheet fabricated from the geo-textile material, said at least one exterior sidewall and at least one interior sidewall being secured adjacently to form at least one 2-ply sidewall, wherein the at least one interior sidewall faces an interior of the plant container and the at least one exterior sidewall forms an exterior of the plant container, said at least one interior and exterior sidewalls comprise a polyester needle-punched felt having soft, breathable and flexible characteristics; and
a second bottom sheet fabricated from the polyester needle-punched felt, said first bottom sheet and said second bottom sheet being positioned adjacently to form a 2-ply bottom sheet, wherein the first bottom sheet faces the interior of the plant container and the second bottom sheet forms the exterior of the plant container; and wherein said 2-ply bottom sheet is secured to a lower portion of the at least one 2-ply sidewall to form a 4-ply lower sidewall portion of the container.

15. The plant container of claim 14, wherein the at least one exterior sidewall and the at least one interior sidewall are of approximately the same dimensions.

16. The plant container of claim 14, wherein the dimensions of the second bottom sheet are larger than the first bottom sheet.

17. The plant container of claim 14, wherein the 2-ply bottom sheet overlaps the at least one 2-ply sidewall on the exterior of the plant container.

18. The plant container of claim 14, wherein the exterior sidewalls and interior sidewalls are secured to each other by at least one of stitching, a mechanical fastener and adhesive.

19. The plant container of claim 14, wherein the 2-ply bottom sheet and the 2-ply sidewall are secured together by at least one of stitching and adhesive.

20. The plant container of claim 14, wherein the water impermeable material is selected from the group consisting of rubber, plastic and vinyl.

21. The plant container of claim 14, wherein said at least one 2-ply bottom sheet forms a resistant abrasion/condensation layer of the plant container.

22. A plant container comprising:
a plurality of sidewalls each comprising:
a breathable material permeable to air and moisture;
a first sidewall end; and
a second sidewall end, wherein the first and second sidewall ends of each sidewall are joined to a sidewall end of another sidewall; and
an air and moisture impermeable bottom liner comprising a base portion and a plurality of lower sidewall sections extending upwards from the base portion and, wherein:
the plurality of lower sidewall sections are joined to an exterior bottom portion of each of the plurality of sidewalls at a distance from the base portion to form an enclosure with an open top portion;
the bottom liner forms a reservoir for retaining water along a bottom portion of the enclosure extending the distance from the base portion to an interior bottom portion of the plurality of sidewalls; and
the breathable material of the plurality of sidewalls extends upwards from the reservoir to the open top portion of the enclosure.

* * * * *